(12) United States Patent
Goto et al.

(10) Patent No.: US 7,167,141 B2
(45) Date of Patent: Jan. 23, 2007

(54) LIQUID CRYSTAL DISPLAY DEVICE

(75) Inventors: Mitsuru Goto, Chiba (JP); Yuichi Numata, Mobara (JP); Masato Sawahata, Ichihara (JP); Yoshinori Aoki, Mobara (JP); Youichi Ooki, IMobara (JP)

(73) Assignees: Hitachi Displays, Ltd., Mobara (JP); Hitachi Device Engineering Co., Ltd., Mobara (JP)

( * ) Notice: Subject to any disclaimer, the term of this patent is extended or adjusted under 35 U.S.C. 154(b) by 426 days.

(21) Appl. No.: 10/628,362

(22) Filed: Jul. 29, 2003

(65) Prior Publication Data
US 2004/0021616 A1    Feb. 5, 2004

(30) Foreign Application Priority Data
Jul. 30, 2002    (JP) .............................. 2002-220606

(51) Int. Cl.
*G09G 5/00*    (2006.01)
(52) U.S. Cl. ......................................... 345/1.1; 345/87
(58) Field of Classification Search ................ 345/1.1, 345/1.2, 1.3, 87, 211; 349/142, 150, 151, 349/152
See application file for complete search history.

(56) References Cited

U.S. PATENT DOCUMENTS

| | | | |
|---|---|---|---|
| 6,326,959 B1 | 12/2001 | Tanaka | |
| 6,529,257 B1 | 3/2003 | Nakano | |
| 6,677,925 B1 * | 1/2004 | Kawaguchi et al. | .......... 345/98 |
| 6,954,184 B1 * | 10/2005 | Kurashima et al. | .......... 345/1.3 |

FOREIGN PATENT DOCUMENTS

| | | | |
|---|---|---|---|
| JP | 10-319368 | | 12/1998 |
| JP | 2001-067049 | * | 3/2001 |
| JP | 2001-117072 | | 4/2001 |
| JP | 2001-282145 | | 10/2001 |

* cited by examiner

*Primary Examiner*—Dennis-Doon Chow
(74) *Attorney, Agent, or Firm*—Antonelli, Terry, Stout and Kraus, LLP.

(57) ABSTRACT

A display device used in a miniaturized portable equipment is capable of driving two display panels, consisting of main and sub-display panels. The display device includes a main display panel, a sub-display panel and a drive circuit. The drive circuit can simultaneously drive the main display panel and the sub-display panel. Output terminals are provided to the main display panel, and signals are transmitted to the sub-display panel from the output terminals. Further, the drive circuit includes a power source circuit which is capable of outputting proper common voltages to the main display panel and the sub-display panel.

3 Claims, 29 Drawing Sheets

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| 0 | 0 | 0 | * | GON | VCMG | BT2 | BT1 | BT0 | DC2 | DC1 | DC0 | AP2 | AP1 | AP0 | SLP |
| 0 | 0 | 1 | 0 | 0 | COM1 | COM2 | * | PON | * | * | * | * | * | * | * |
| 0 | 0 | 1 | 0 | 1 | * | * | * | 0 | * | * | MI1 | MI0 | MFL2 | MFL1 | MFL0 |
| 0 | 1 | 0 | 0 | 0 | 0 | VDV4 | VDV3 | VDV2 | VDV1 | VDV0 | VCM4 | VCM3 | VCM2 | VCM1 | VCM0 |
| 1 | 1 | 0 | 0 | 0 | GS | NL4 | NL3 | NL2 | NL1 | NL0 | SC4 | SC3 | SC2 | SC1 | SC0 |
| 1 | 1 | 1 | 0 | 0 | 0 | 0 | 0 | 0 | 0 | 0 | 0 | 0 | 0 | FL1 | FL0 |

ID

LIQUID CRYSTAL DISPLAY DEVICE

BACKGROUND OF THE INVENTION

The present invention relates to a liquid crystal display device, and, more particularly, to a technique which is applicable to drive circuits of a liquid crystal display device of the type used in a portable display device.

Liquid crystal display devices of the STN (Super Twisted Nematic) type or liquid crystal display devices of the TFT (Thin Film Transistor) type have been popularly used as display devices in notebook type personal computers or the like. The typical liquid crystal display device includes a liquid crystal display panel and drive circuits for driving the liquid crystal display panel.

Here, among these liquid crystal display devices, the use of liquid crystal display devices as display devices in portable terminal devices, such as mobile telephones or the like, is increasing in number. To adapt a liquid crystal display device for use as the display device in a portable terminal devices, there is a need for a further reduction of the cost, miniaturization, an enhancement of the image quality and enhancement of the reduction of power consumption, compared to conventional liquid crystal display devices. Further, when a liquid crystal display device is used as the display device in a mobile telephone or the like, a type of portable telephone set which mounts two liquid crystal display panels on one mobile telephone has been commercially available.

In display devices of the type used in portable terminal devices, such as mobile telephones, along with the spread of electronic mail to which images are attached, a further enhancement of the image display functions is demanded. Further, even when two liquid crystal display panels are mounted on one mobile telephone, both of these liquid crystal display panels are required to provide high image display functions, such as a high display quality and high definition. Still further, in view of the nature of these display devices, in that they are used as portable terminals, lower power consumption is also demanded. In addition, it is also a crucial task of the display devices which are used as portable terminals to strengthen the competitiveness in relation to cost.

As a problem which arises along with miniaturization of the portable terminal device, there is a decrease in the space for mounting drive circuits of the liquid crystal display device. Further, with respect to a method for mounting the drive circuits, there has been a demand for so-called screen centering, that is, a method in which the center line of the device and the center of a display screen are superposed on each other. This screen centering restricts the positions where drive circuits can be mounted, and, hence, it is necessary to pay sufficient consideration to the arrangement of the display devices. Further, in the conventional liquid crystal display device, although the drive circuits have been arranged at two neighboring sides of the display screen, there is a demand for mounting the drive circuits only at one side, that is, so-called three-side-free mounting. Further, it is also necessary to decrease the number of mounting parts for decreasing the mounting areas as well as for lowering the manufacturing cost.

Particularly, when two liquid crystal display panels are mounted on one mobile telephone, it is necessary to mount the drive circuits and various parts in relation to the respective liquid crystal display panels; and, hence, there arises a drawback in that the mounting area for these drive circuits and various parts is increased.

Still further, with respect to equipment, such as a mobile telephone, which is intended for use by unspecified individuals, stable operation is requested even when a manner of operation different from the usual manner of operation is performed. Accordingly, even in an unpredictable state, such as a case in which a battery which constitutes a power source of the mobile telephone slips off, an operation which is similar to the operation performed when the power source is normally turned off, which does not display the image retention on a screen, is requested.

The present invention has been made to overcome the above-mentioned drawbacks, and it is an object of the present invention to provide a technique by which one can realize an optimum drive circuit when two liquid crystal display panels are mounted in equipment using small-sized liquid crystal display devices.

The above-mentioned and other objects and novel features of the present invention will become apparent from the description provided in this specification and the attached drawings.

SUMMARY OF THE INVENTION

Typical aspects of the invention, among the features of the invention disclosed in this specification, are as follows.

In a liquid crystal display device including two liquid crystal display panels and a drive circuit, the drive circuit is mounted on one liquid crystal display panel, an output terminal is formed on one side of the liquid crystal display panel on which the drive circuit is mounted, the output terminal and another liquid crystal display panel are connected by wiring, wherein two liquid crystal display panels are driven by the drive circuit, common voltages which are suitable for two respective liquid crystal display panels are outputted from the drive circuit, and the common voltages are supplied to another liquid crystal display panel through the wiring.

Further, the drive circuit includes a power source circuit which is capable of outputting two common voltages for supplying the optimum common voltages for two liquid crystal display panels.

BRIEF DESCRIPTION OF THE DRAWINGS

FIG. 9A and FIG. 9B are schematic circuit diagrams of booster circuits used in the liquid crystal display device of the present invention, wherein FIG. 9A is the circuit diagram of the circuit in a charged state, and FIG. 9B is the circuit diagram of the circuit in a discharged state.

FIG. 31A and FIG. 31B are schematic diagrams of a mirror type liquid crystal display panel used in the liquid crystal display device of the present invention, wherein FIG. 31A is a view showing an optical path in a state in which a voltage is applied between electrodes, and FIG. 31B is a view showing an optical path in a state in which a voltage is not applied between electrodes.

DESCRIPTION OF THE PREFERRED EMBODIMENTS

Preferred embodiments of a display device according to the present invention will be explained in detail hereinafter in conjunction with the drawings. Here, in all the drawings, parts having identical functions are given the same symbols, and a repeated explanation thereof is omitted.

Figure 1:
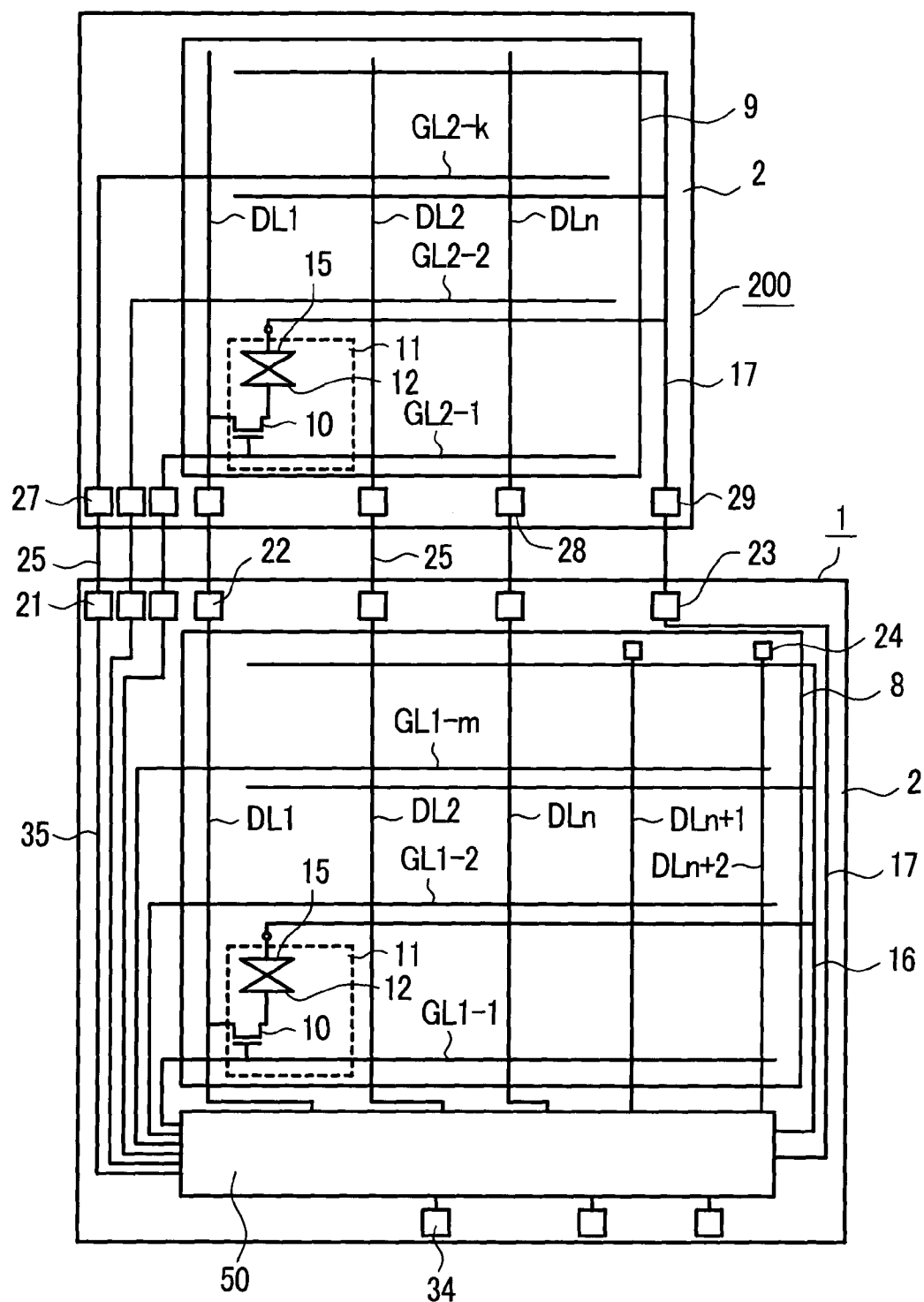
FIG. 1 is a schematic diagram showing a liquid crystal display device representing an embodiment of the present invention.

FIG. 1 is a block diagram showing the basic constitution of a display device using TFTs (Thin Film Transistor), according to the present invention. For example, an organic electro luminescence display and a liquid crystal display typically use TFTs. As shown in the drawing, the display device of this embodiment includes a first display panel 1, a second display panel 200 and a drive circuit 50. When these display panels are used for a mobile telephone, the first display panel 1 is used as a main panel and the second display panel 200 is used as a sub-panel, which is mounted on a back surface of the equipment.

The following explanations are directed to examples of a liquid crystal display device.

On the first liquid crystal display panel 1 and the second liquid crystal display panel 200, a plurality of scanning signal lines (or gate signal lines) GL and video signal lines (or drain signal lines) DL are respectively juxtaposed. Pixel portions 11 are formed corresponding to portions where the scanning signal lines GL and the video signal lines DL cross each other. A plurality of pixel portions 11 are arranged in a matrix array (not shown in the drawing), thus forming a display region 8 and a display region 9. Each pixel portion 11 includes a pixel electrode 12 and a thin film transistor 10. A TFT substrate 2, on which the pixel electrodes 12, the thin film transistors 10 and the like are formed, and a filter substrate (not shown in the drawing), on which color filters and the like are formed, are overlapped relative to each other with a given gap therebetween, thus forming a liquid crystal display panel. A sealing material is formed in a frame shape at a peripheral portion defined between both substrates, both substrates are laminated to each other, and liquid crystal is filled into and sealed in the space inside of the sealing material that is arranged between both substrates, through a liquid crystal filling port formed in a portion of the sealing material.

Conventionally, the main usage of the sub-panel is to display letters or characters. Accordingly, a liquid crystal display panel having an inferior image quality is used as the sub-panel. However, the sub-panel is now used as a finder in a mobile telephone provided with a camera; and, hence, the sub-panel is required to exhibit image qualities comparable to the image qualities of the main panel. Accordingly, in accordance with the present invention, the second liquid crystal display panel 200 also uses a TFT type liquid crystal display panel.

Accordingly, in both of the first liquid crystal display panel 1 and the second liquid crystal display panel 200, a thin film transistor 10 is provided at each pixel portion. The thin film transistor 10 of each pixel has a source thereof connected to the pixel electrode 12, a drain thereof connected to the video signal line DL, and a gate thereof connected to the scanning signal line GL. The thin film transistor 10 functions as a switch for supplying display voltages (gray scale voltages) to the pixel electrode 12. By applying a voltage between the pixel electrodes 12 and the counter electrodes 15, the orientation direction of the liquid crystal molecules is changed, and a display is produced by making use of a phenomenon in which the property of the liquid crystal layer regarding light transmission is changed corresponding to the change of the orientation direction of the liquid crystal molecules. The TFT type liquid crystal display panel is of a type in which the thin film transistors 10 function as switches, and the voltage is held by the pixel electrodes 12; and, hence, a liquid crystal display panel of high quality, with high contrast and the like, can be realized.

Here, although designation of the "source" and "drain" may be reversed depending on the bias relationship, the terminal which is connected to the video signal line DL is referred to herein as the "drain". Further, this embodiment is also applicable in the same manner to a so-called lateral electric field type liquid crystal display panel, in which counter electrodes 15 are formed on the TFT substrate 2, and also to a so-called vertical electric field type liquid crystal display panel, in which the counter electrodes 15 are formed on the filter substrates.

To drive the liquid crystal display panel 1 and the liquid crystal display panel 200 so as to make these panels produce a display, scanning signals and video signals are supplied to the scanning signal lines GL and the video signal lines DL, respectively, while signals are supplied to the counter electrodes 15 from the drive circuit 50. The drive circuit 50 is mounted (or formed) on a transparent insulating substrate (a glass substrate, a resin substrate or the like) which constitutes the TFT substrate 2 of the liquid crystal display panel 1. Further, the drive circuit 50 is electrically connected with the video signal lines DL, the scanning signal lines GL, a counter electrode line 16 for the first liquid crystal display panel and a counter electrode line 17 for the second liquid crystal display panel, which are formed on the TFT substrate 2. Here, although the drive circuit 50 is constituted of a semiconductor integrated circuit (LSI), when the drive circuit 50 is formed on a substrate separate from the TFT substrate 2, the drive circuit 50 is directly mounted on the TFT substrate 2, or it is mounted by means of a TCP (Tape Carrier Package). Further, it is also possible to constitute the drive circuit 50 using a semiconductor circuit which is directly formed on a substrate equal to the TFT substrate 2.

The drive circuit 50 functions to supply gray scale voltages to the video signal lines DL, controls ON/OFF operation of the thin film transistors 10 in response to the scanning signals and writes the gray scale voltages to the pixel electrodes 12. Further, the drive circuit 50 supplies a common voltage to the counter electrodes 15. Still further, the drive circuit 50 functions as a controller, and, hence, signals are supplied to the drive circuit 50 from an external CPU or the like (not shown in the drawing). Accordingly, the drive circuit 50 is provided with input terminals 34, and signals from the outside are inputted into or supplied to the drive circuit 50 through the input terminals 34. In response to respective display control signals that are inputted from the outside, such as clock signals, display timing signals, horizontal synchronizing signals, vertical synchronizing signals and display data (R/G/B), the drive circuit 50 produces signals for controlling and driving the liquid crystal display panels.

To briefly explain the manner of operation of the drive circuit 50, the drive circuit 50 forms a frame start instruction signal FLM (also referred to as start signal hereinafter) and a shift clock CL1 in response to external signals and supplies selective scanning voltages (scanning signals) of High level to respective scanning signal lines GL of the liquid crystal display panel 1 and the liquid crystal display panel 200 for every 1 horizontal scanning time (hereinafter, also referred to as "1H"). Accordingly, a plurality of thin film transistors 10, which are connected to respective scanning signal lines GL of the liquid crystal display panel 1 and the liquid crystal display panel 200, become conductive for one horizontal scanning time 1H.

Further, the drive circuit 50 outputs a gray scale voltage, corresponding to a gray scale to be displayed by the pixel, to the video signal line DL. When the thin film transistor 10 assumes the ON state, the gray scale voltage (video signal) is supplied to the pixel electrode 12 from the video signal line DL. Thereafter, when the thin film transistor 10 assumes the OFF state, the gray scale voltage, based on an image to be displayed by the pixel, is held at the pixel electrode 12.

The drive circuit 50 drives not only the liquid crystal display panel 1, but also the liquid crystal display panel 200. Accordingly, the signals are also supplied to the liquid crystal display panel 200 from the liquid crystal display panel 1 on which the drive circuit 50 is mounted. Numeral 21 indicates output terminals of scanning signals which are connected to input terminals 27 of the liquid crystal display panel 200 side through lines 25. Accordingly, on the liquid crystal display panel 1, lines (wiring) 35 are formed for supplying the scanning signals, for the liquid crystal display panel 200 are formed. Further, numerals 22 indicate output terminals for video signals and gray scale voltages supplied to the liquid crystal display panel 200 are outputted from these output terminals 22. Accordingly, the video signal lines DL connected to the drive circuit 50 are not only connected to the thin film transistors 10 within the display region 8, but also extend outside the display region 8 and are connected to output terminals 22.

Here, when the number of video signal lines DL of the liquid crystal display panel 1 is large compared to the number of the video signal lines DL mounted on the liquid crystal display panel 200, there exist video signal lines DL which are not connected to the liquid crystal display panel 200. In FIG. 1, although the video signal line DLn+1 and ensuing video signal lines are not connected to the liquid crystal display panel 200, these video signal lines are different from the video signal lines DLn and the like which have line capacitances thereof connected to the liquid crystal display panel 200. Accordingly, line capacitance adjusting elements 24 are provided to the video signal lines which are not connected to the liquid crystal display panel 200.

As a method of driving the liquid crystal display panel 1 and the liquid crystal display panel 200, it is possible to adopt a method in which the two liquid crystal display panels 1, 200 are being driven as if one liquid crystal display panel is driven. That is, for example, the scanning of the signal lines starts from the scanning signal line GL1-1 of the liquid crystal display panel 1, and scanning signal lines are scanned in order up to the scanning signal line GL1-$m$. Subsequently, the scanning signal lines are scanned from the scanning signal line GL2-1 to the scanning signal line GL2-$k$ of the liquid crystal display panel 200. Here, although the gray scale voltage is outputted to the video signal line DL in the above operation, during a period in which the scanning signal lines are scanned from the scanning signal lines GL2-1 to GL2-$k$, the gray scale voltage to be supplied to the liquid crystal display panel 200 is outputted also to the video signal lines DL mounted on the liquid crystal display panel 1.

Further, in the drive circuit 50, the counter electrode line 16 for the first liquid crystal display panel and the counter electrode line 17 for the second liquid crystal display panel are electrically connected to the counter electrodes 15. The liquid crystal display panel 1 is provided with an output terminal 23 which is connected to the counter electrode line 16, while the output terminal 23 and an input terminal 29 formed on the liquid crystal display panel 200 are connected to each other using lines 25.

In the liquid crystal display device to which the present invention is applicable, AC driving, which periodically inverts the polarity of voltage applied to the liquid crystal layer, is performed. This AC driving is performed for the purpose of preventing degradation generated by applying a DC voltage to the liquid crystal. However, even when the AC driving is performed, there may be a case in which a minute DC component is applied to the liquid crystal layer. In such a case, the DC component can be eliminated by adjusting the common voltage applied to the counter electrodes. Accordingly, an optimum common voltage value is set for each liquid crystal display panel.

As mentioned previously, the liquid crystal display panel 1 and the liquid crystal display panel 200 are driven using the same drive circuit 50. However, the generation of the DC component is not attributed only to the difference between voltages applied to the pixel electrode 12 and the counter electrode 15; and, hence, even when these display panels are driven by the same drive circuit 50, the DC components which are generated in the liquid crystal display panel 1 and the liquid crystal display panel 200 differ to some extent. Accordingly, individually optimum common voltages are supplied between the liquid crystal display panel 1 and the liquid crystal display panel 200.

When the optimum common voltage is not set, a phenomenon referred to as flicker is generated on the display so that the display quality is remarkably degraded. It is possible to output two common voltages, respectively, for liquid crystal display panel 1 and liquid crystal display panel 200, from the drive circuit 50, and the two common voltages can be finely adjusted. Accordingly, by individually finely adjusting respective common voltages such that flicker on respective liquid crystal display panels can be reduced, it is possible to supply two optimum common voltages for the liquid crystal display panel 1 and the liquid crystal display panel 200, respectively, whereby the degradation of display quality due to flicker or the like can be prevented.

In the liquid crystal display device shown in FIG. 1, the liquid crystal display panel 1 and the liquid crystal display panel 200 can be driven by the common drive circuit 50; and, hence, it is possible to miniaturize the liquid crystal display device by reducing an area for mounting the drive circuit and to reduce the cost by using parts in common. Further, not only by outputting common signals to the liquid crystal display panel 1 and the liquid crystal display panel 200, but also by outputting common voltages peculiar to two liquid crystal display panels, it is possible to produce favorable displays, even when two liquid crystal display panels are driven using the same drive circuit.

Figure 2:
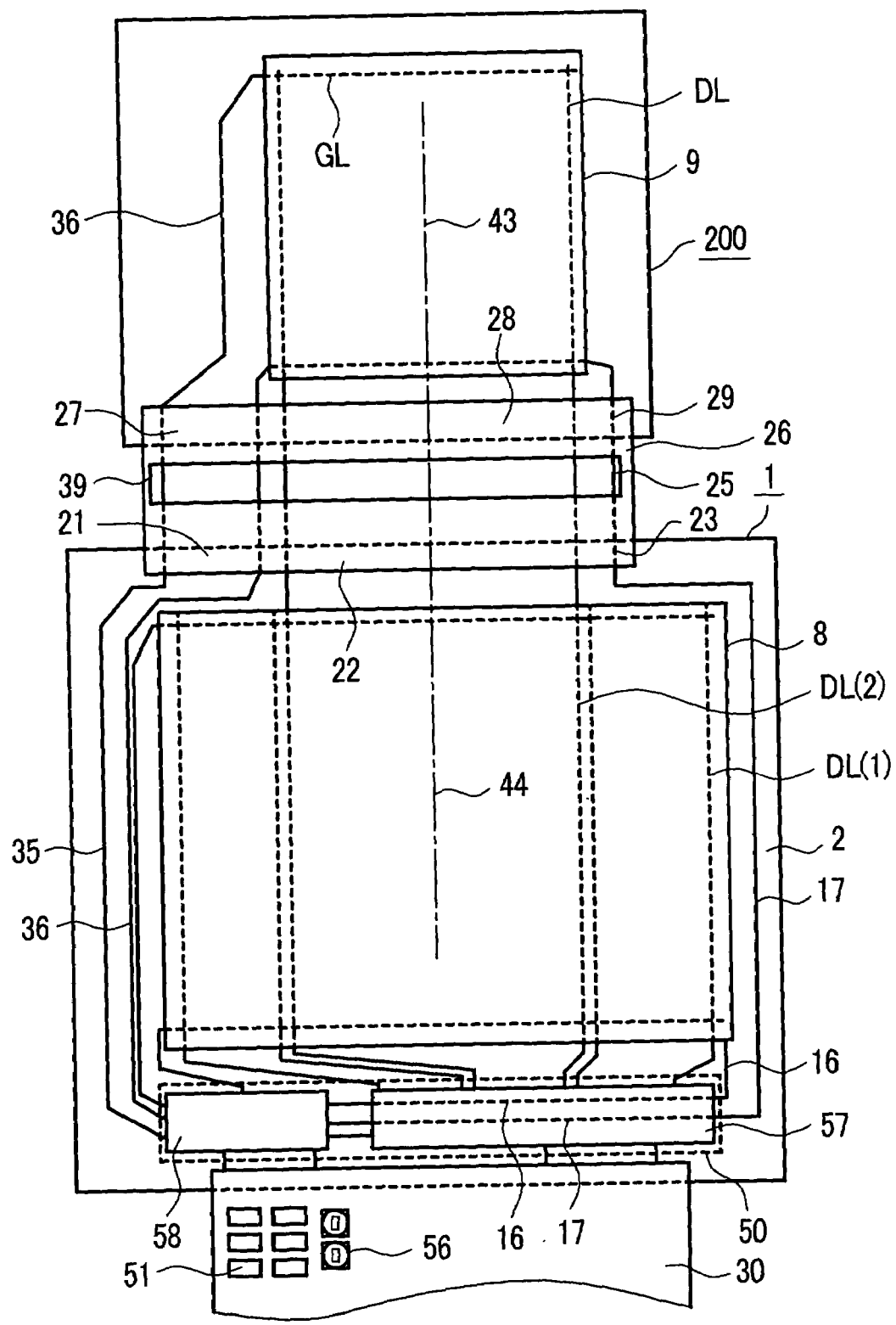
FIG. 2 is a schematic diagram showing in plan view the liquid crystal display device of another embodiment of the present invention.

Next, FIG. 2 is a plan view which schematically shows the connection between the liquid crystal display panel 1 and the liquid crystal display panel 200 using a flexible board 26. Connection terminals are provided to the flexible board 26, and these connection terminals are electrically connected to the output terminals 21, 22, 23 provided to the liquid crystal display panel 1 and input terminals 27, 28, 29 provided to the liquid crystal display panel 200, using an anisotropic conductive film or the like. Respective output terminals and input terminals are electrically connected using this flexible board 26, and signals can be transmitted between the liquid crystal display panel 1 and the liquid crystal display panel 200.

Here, respective terminals are juxtaposed in large number at a narrow pitch, so that it is difficult to clearly illustrate the terminals in the drawing. Accordingly, only the terminals at both ends are shown with respect to respective terminals, and the description of each terminal is omitted in the drawing. Further, in a mobile telephone, a use mode in which the flexible board is bent so as to mount the liquid crystal display panel 1 and the liquid crystal display panel 200 on a front surface and a back surface of a light guide plate is adopted. To facilitate understanding of the drawing, the liquid crystal display panel 1 and the liquid crystal display panel 200 are illustrated as being on the same plane.

FIG. 2 shows a case in which the drive circuit 50 mounted on the liquid crystal display panel 1 is divided into a scanning signal line drive circuit 58 and a video signal line drive circuit 57. A sub-panel scanning signal line 35 is formed on the liquid crystal display panel 1. A line 35 for sub-panel scanning signal 35, which is outputted from the scanning signal line drive circuit 58, is connected to a scanning signal output terminal 21. Further, scanning signals which are supplied to the liquid crystal display panel 200 are outputted from the scanning signal output terminal 21 and are transmitted to an input terminal 27 of the liquid crystal display panel 200 through the flexible board 26. A line 36 for scanning signal lines is formed on the liquid crystal display panel 200 and is connected to respective scanning signal lines GL through the input terminal 27. Here, the line 36 for scanning signals is formed on the liquid crystal display panel 1 in the same manner and connects between the scanning signal line drive circuit 58 provided on a lower side of the liquid crystal display panel 1 and respective scanning signal lines GL.

Further, a counter electrode line 16 for liquid crystal display panel 1 and a counter electrode line 17 for liquid crystal display panel 200 extend from the scanning signal line drive circuit 58. They are arranged to pass between the video signal line drive circuit 57 and the TFT substrate 2. The counter electrode line 16 is connected to the counter electrodes of the liquid crystal display panel 1, while the counter electrode line 17 is arranged along the side (a right side in the drawing) which opposes a side on which the line 36 for the scanning signal for the TFT substrate 2 is formed and is connected to the output terminal 23. Further, the counter electrode line 17 for the liquid crystal display panel 200 is connected to the counter electrode of the liquid crystal display panel 200 through the flexible board 26.

In FIG. 2, since the display region 8 of the liquid crystal display panel 1 is present between the display region 9 of the liquid crystal display panel 200 and the drive circuit 50, the lines for driving the liquid crystal display panel 200 are formed around the display region 8, as in the case of the line 35 for sub-panel scanning signals. However, since the video signal lines DL can be used in common by the liquid crystal display panel 1 and the liquid crystal display panel 200, the video signal lines DL can be arranged inside the display region 8 and can extend to the outside of the display region 8 and can be arranged in the liquid crystal display panel 200. Here, in the display device, it is preferable that the area of those portions other than the display region should be as small as possible, and, hence, it is taken into consideration in this embodiment that the region in which the sub-panel scanning signal line 35 extends around the display region is made as small as possible.

Numeral 30 indicates a flexible board to which signals and the power source voltages and the like to be inputted to the drive circuit 50 are supplied. Further, numeral 51 indicates a capacitor which is used in a booster circuit or the like of the drive circuit 50. Further, numeral 56 indicates a variable resistor which is used for finely adjusting the common voltage.

Here, the gray scale voltages are outputted to the liquid crystal display panel 200 from the video signal line drive circuit 57, wherein the gray scale voltages are supplied to the liquid crystal display panel 1 by the video signal lines DL(2) and, at the same time, the gray scale voltages are supplied also to the liquid crystal display panel 200. To suppose the center line 43 of the liquid crystal display panel 200 and the center line 44 of the liquid crystal display panel 1 on each other as much as possible, as the video signal lines DL (2) which supply the gray scale voltages also to the liquid crystal display panel 200, the video signal lines at the center portion of the liquid crystal display panel 1 are used. Accordingly, at both ends of the region where the video signal lines DL (2) are formed, the video signal lines DL(1) which are not connected to the liquid crystal display panel 200 are provided.

The flexible substrate 25 is formed of a flexible material, and, hence, it can be folded. Accordingly, by folding the flexible board 25, it is possible to form the liquid crystal display panel 1 and the liquid crystal display panel 200 on two respective surfaces of the light guide plate, while sandwiching one light guide plate therebetween. Further, a slit 39 is formed in the flexible board 25 to facilitate folding of the flexible board 25.

Figure 3:
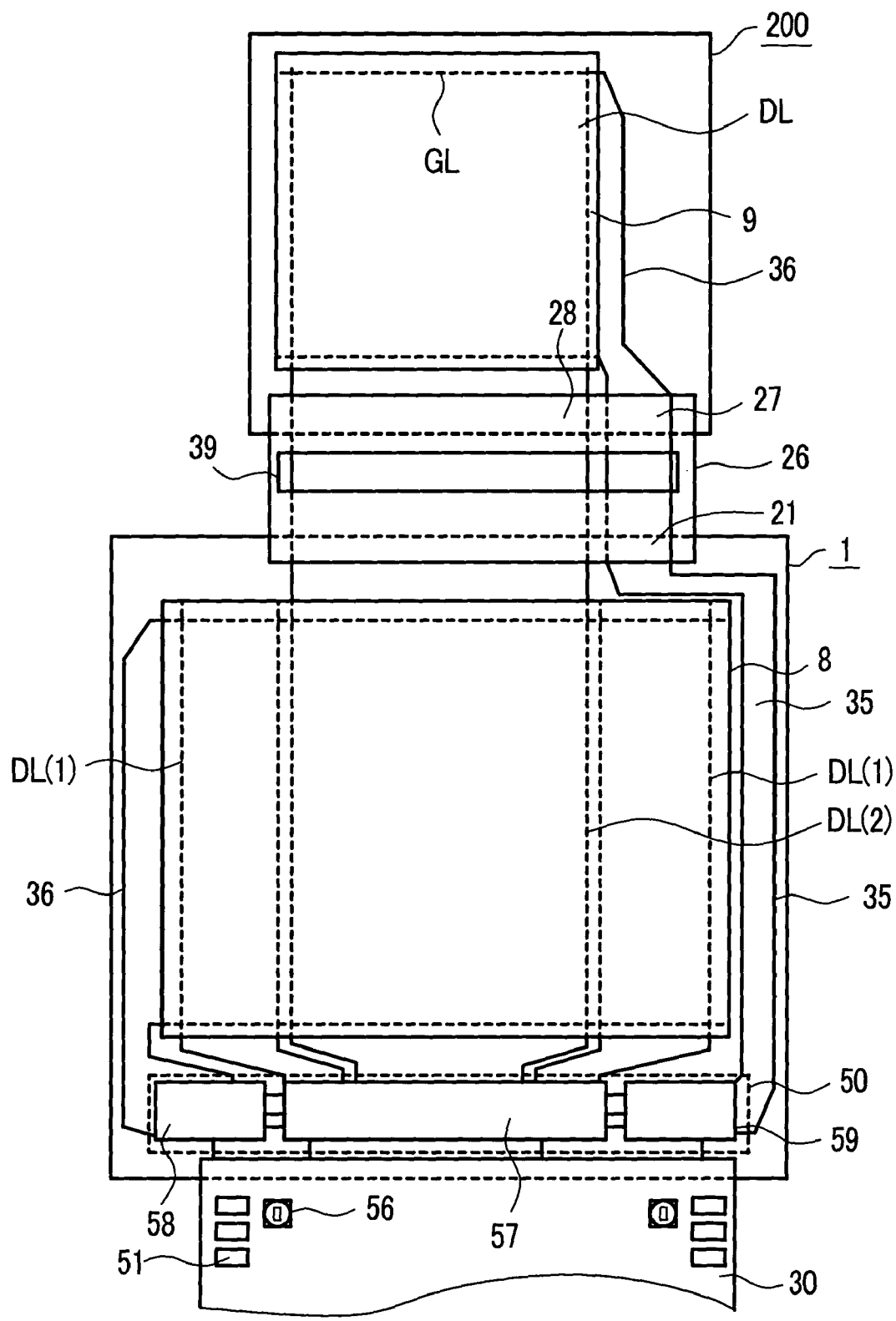
FIG. 3 is a schematic diagram showing in plan view the liquid crystal display device of another embodiment of the present invention.

FIG. 3 shows an embodiment in which the scanning signal line drive circuit 58 for liquid crystal display panel 1 and the scanning signal line drive circuit 59 for liquid crystal display panel 200 are formed, while sandwiching a video signal line drive circuit 57 therebetween. On a side of the liquid crystal display panel 1 disposed at the left side of the drawing, a line 36 for scanning signals is formed, and this line 36 connects the scanning signal line drive circuit 58 and the respective scanning signal lines GL. Further, a line 35 for sub-panel scanning signals is formed on the right side of the liquid crystal display panel 1. The line 35 for sub-panel scanning signals, which extends from the scanning signal line drive circuit 59, is connected to a scanning signal output terminal 21. Further, scanning signals which are supplied to the liquid crystal display panel 200 are outputted from the scanning signal output terminals 21 and are transmitted to input terminals 27 of the liquid crystal display panel 200 through the flexible board 26.

As shown in FIG. 3, by providing the scanning signal line drive circuits 58 and the scanning signal line drive circuit 59 in a state in which the video signal line drive circuit 57 is sandwiched therebetween, it is possible to separately arrange the line 36 for scanning signals and the line 35 for sub-panel scanning signals at both left and right end portions of the display region 8. Further, the scanning signal line drive circuit 58, the scanning signal line drive circuit 59 and the video signal line drive circuit 57 can be integrally formed as one driver circuit 50.

Here, although not shown in the drawing, the common voltage for the liquid crystal display panel 1 is outputted from the scanning signal line drive circuit 58, and the common voltage for the liquid crystal display panel 200 is outputted from the scanning signal line drive circuit 59, and, hence, the optimum common voltages for respective liquid crystal display panels are supplied.

Figure 4:
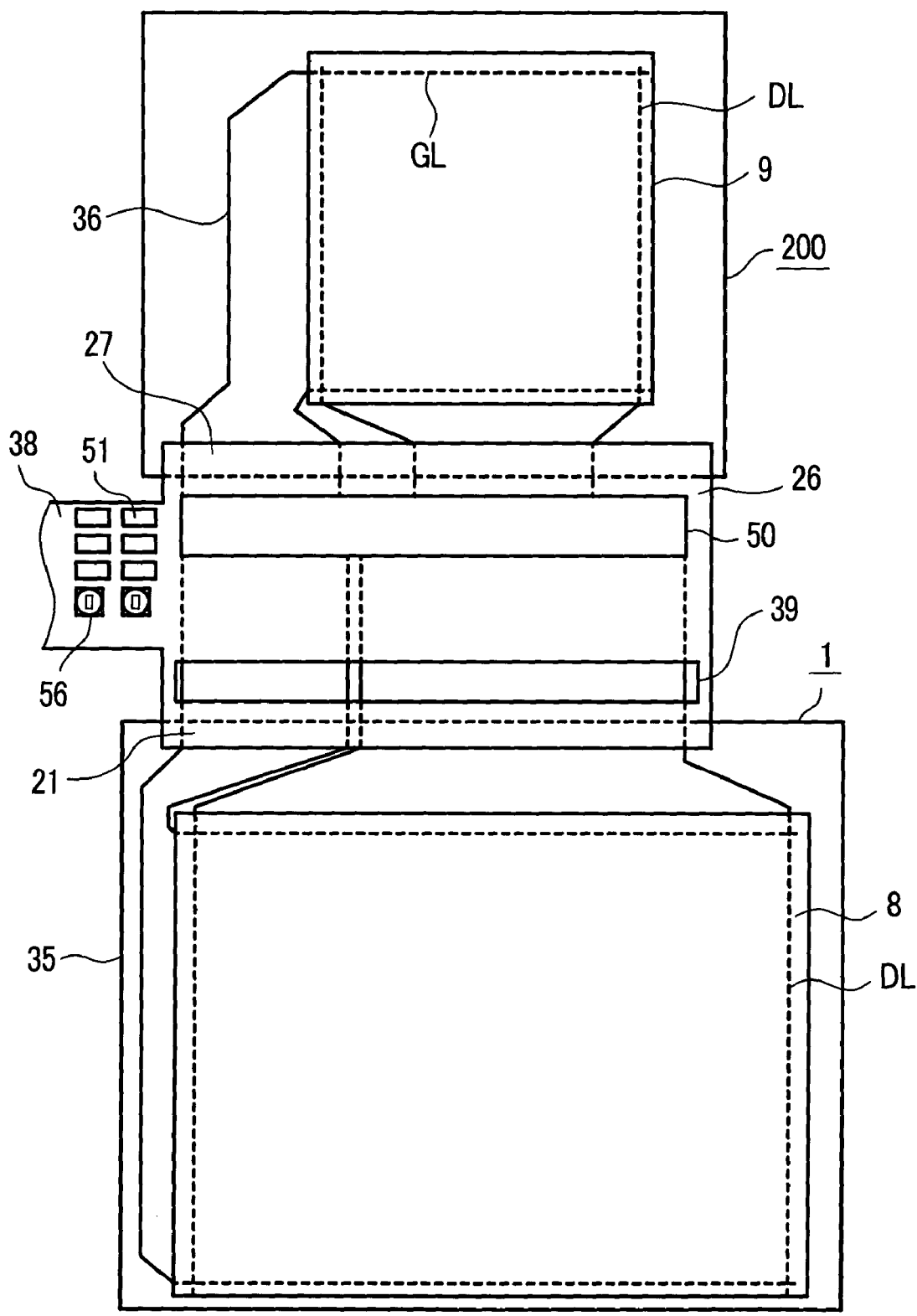
FIG. 4 is a schematic diagram showing in plan view the liquid crystal display device of another embodiment of the present invention.

FIG. 4 shows an embodiment in which the drive circuit 50 is mounted on the flexible board 26, and the flexible board 26 is provided between the liquid crystal display panel 1 and the liquid crystal display panel 200. From the drive circuit 50, signals for the liquid crystal display panel 1 are outputted to the lower side, as seen in the drawing, and signals for the liquid crystal display panel 200 are outputted to the upper side, as seen in the drawing.

Since the drive circuit 50 is provided between the display region 8 of the liquid crystal display panel 1 and the display region 9 of the liquid crystal display panel 200, signal lines for the liquid crystal display panel 200 formed on the liquid crystal display panel 1 can be omitted, whereby the line 35 for the sub-panel scanning signal is not provided to the liquid crystal display panel 1. Accordingly, the line (wiring) region can be reduced so that the liquid crystal display device can be miniaturized. Further, a capacitor 51, a variable resistor 56 and the like are also mounted on the flexible board 26. Numeral 38 indicates a wiring portion for external connection, which extends outward so as to be connected to external equipment. Accordingly, the flexible board for inputting can be used in common, and, hence, the number of parts can be reduced.

In the drive circuit 50 shown in FIG. 4, the lines (wiring) are extended to the lower side, as seen in the drawing, from one output and are connected to the liquid crystal display panel 1; and, at the same time, the lines (wiring) are extended to the upper side, as seen in the drawing, from the same output and are connected to the liquid crystal display panel 200, whereby it is possible to use one output in common. However, separate outputs may be provided for the liquid crystal display panel 1 and the liquid crystal display panel 200, respectively. Further, it is also possible to mount a plurality of drive circuits to serve as the drive circuit for the liquid crystal display panel 1 and as the drive circuit for the liquid crystal display panel 200 on the flexible board 26.

Here, although not shown in the drawing, the common voltage for the liquid crystal display panel 1 and the common voltage for the liquid crystal display panel 200 are outputted from the drive circuit 50, and, hence, the optimum common voltages for respective liquid crystal display panels are supplied.

Figure 5:
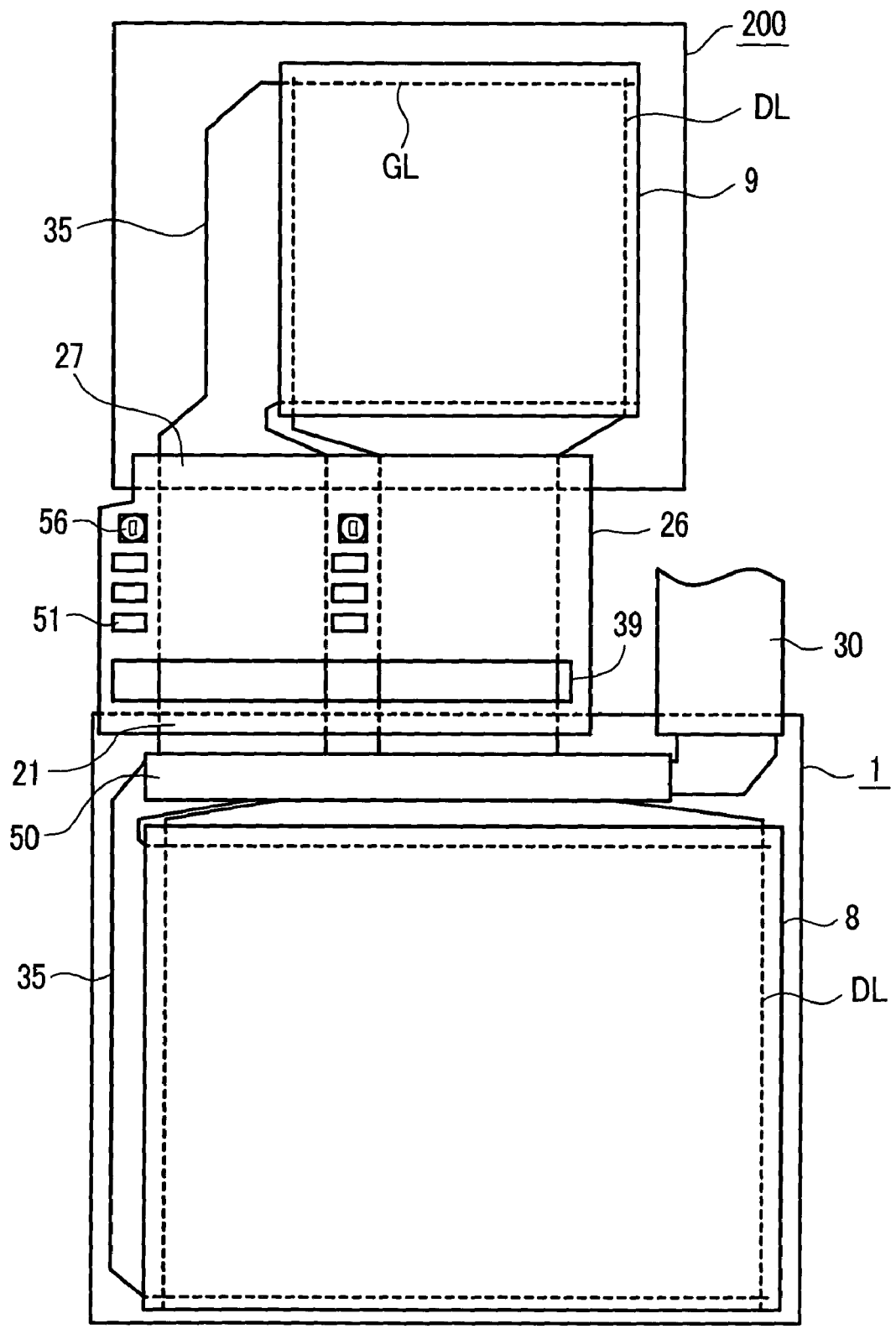
FIG. 5 is a schematic diagram showing in plan view the liquid crystal display device of another embodiment of the present invention.

FIG. 5 shows another embodiment in which the drive circuit 50 is mounted on a side of the liquid crystal display panel 1, which is disposed close to the liquid crystal display panel 200 side. In the same manner as the embodiment shown in FIG. 4, the drive circuit 50 is provided between the display region 8 of the liquid crystal display panel 1 and the liquid crystal display panel 200. From the drive circuit 50, signals for the liquid crystal display panel 1 are outputted to the lower side in the drawing, and signals for the liquid crystal display panel 200 are supplied to the upper side, as seen in the drawing. Further, in the same manner as the embodiment shown in FIG. 4, the signal line for the liquid crystal display panel 200, which is mounted on the liquid crystal display panel 1, can be omitted, and the line 35 for sub-panel scanning signals is not mounted on the liquid crystal display panel 1.

Also, with respect to the drive circuit 50 shown in FIG. 5, the lines (wiring) are extended to the lower side, as seen in the drawing, from one output and are connected to the liquid crystal display panel 1; and, at the same time, the lines (wiring) are extended to the upper side, as seen in the drawing, from the same output and are connected to the liquid crystal display panel 200, whereby it is possible to use one output in common. Further, it is possible to form separate outputs for the liquid crystal display panel 1 and the liquid crystal display panel 200, respectively.

Here, although not shown in the drawing, the common voltage for the liquid crystal display panel 1 and the common voltage for the liquid crystal display panel 200 are outputted from the drive circuit 50, and, hence, the optimum common voltages for respective liquid crystal display panels are supplied.

Figure 6A:
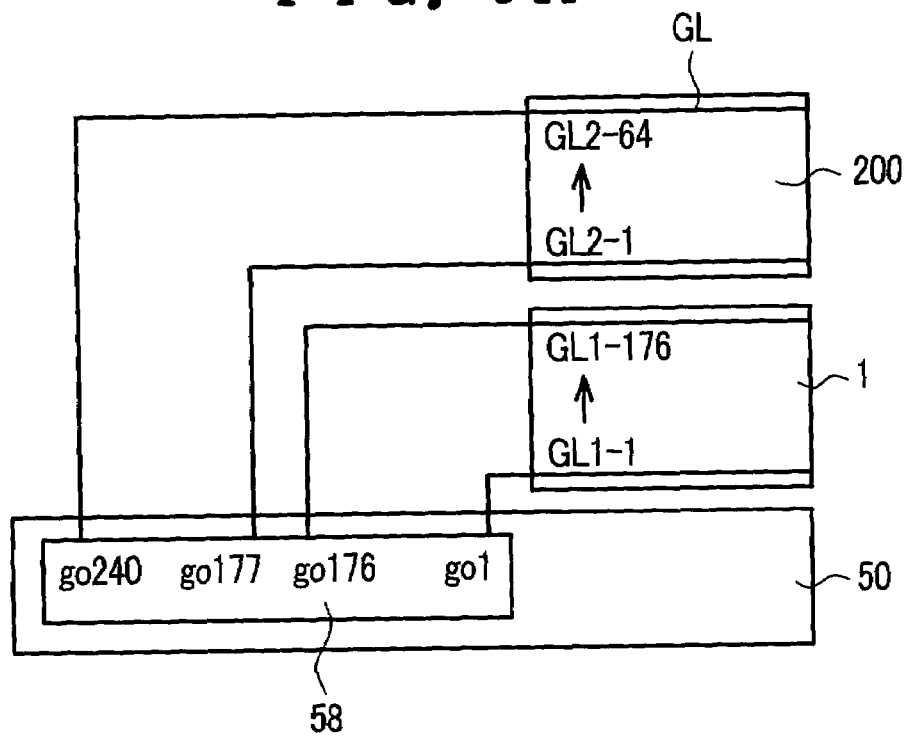
FIG. 6A and FIG. 6B are diagrams illustrating the driving method for supply of scanning signals used in the liquid crystal display device of the present invention.

Next, the relationship between the order of outputting signals from the scanning signal line drive circuit 58 and the scanning signal lines GL will be described in conjunction with FIGS. 6A, 6B and FIGS. 7A, 7B. First of all, as shown in FIG. 6A, when the number of scanning signal lines in the liquid crystal display panel 1 is 176 and the number of scanning signal lines in the liquid crystal display panel 200 is 64, a following driving method can be used. That is, the scanning signal line drive circuit 58 outputs 240 signals and starts outputting in response to an output go1, and it sequentially scans the scanning signal lines GL1-1 to GL1-176. Further, the scanning signal line drive circuit 58 scans GL2-1 next to GL1-176, and finally it scans the scanning signal line GL2-64 in response to an output go240.

Here, when only either one of the liquid crystal display panel 1 and the liquid crystal display panel 200 is displayed, or when a portion of both panels is displayed or the like, since the scanning signal line drive circuit 58 and the video signal line drive circuit 57 are provided in common, a voltage is applied also to a non-display part. Accordingly, it is necessary to perform AC driving of the non-display part, and, hence, signals having different polarities are supplied in the same manner as the display part.

For example, in case the liquid crystal display panel 1 is in a non-display state, since the number of scanning signal lines GL is 240, when one screen (1 frame) is displayed at 50 Hz, the line frequency becomes 50×240=12 kHz per one scanning signal line (one line). However, the number of scanning signal lines which are actually used for display is only 64 lines, and, hence, a line frequency of 50×64=3.2 kHz is sufficient. Rewriting of data with a high driving frequency in spite of the non-display state of the liquid crystal display panel 1 impedes the reduction of the power consumption.

Accordingly, in this embodiment, a scanning of the scanning signal lines at the non-display part is collectively performed. For example, when the liquid crystal display panel 1 is in a non-display state, the scanning signal lines GL1-1 to GL1-176 are simultaneously scanned during one horizontal scanning period 1H (or several H), and, thereafter, the scanning signal lines GL2-1 to GL2-64 are scanned in the usual manner. In the same manner, by performing a collective scanning even when the liquid crystal display panel 200 is in a non-display state, or when only portions of both panels are displayed, it is possible to reduce the power consumption.

Figure 6B:
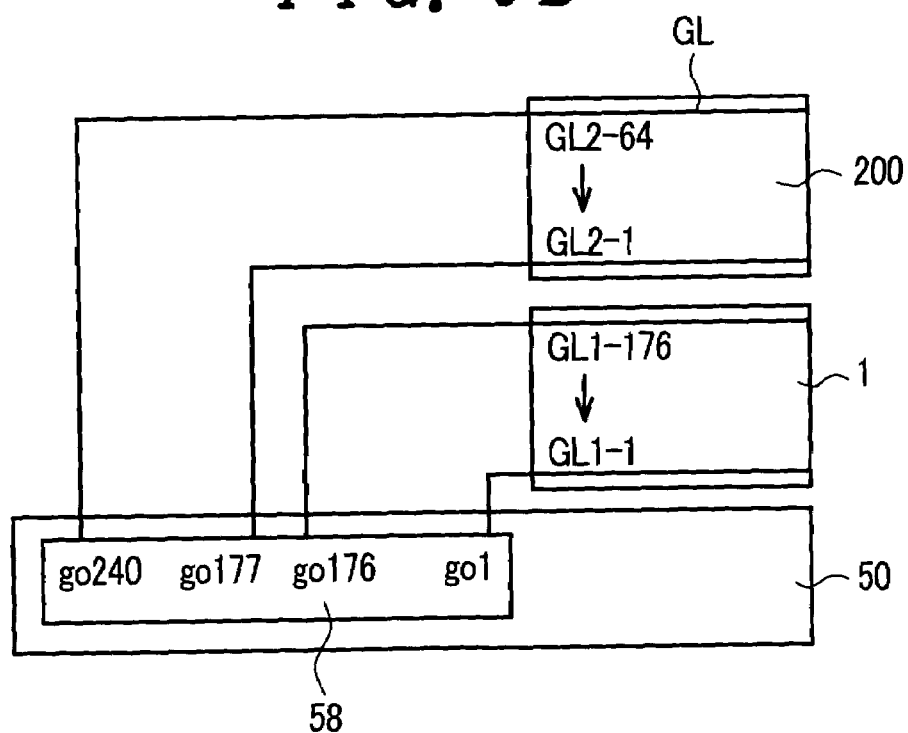

Next, as shown in FIG. 6B, depending on the arrangement of the liquid crystal display panel, it is necessary to scan the liquid crystal display panel 200 first. In such a case, outputting is started in response to the output go240 so as to scan the scanning signal line GL2-64 first and to scan the scanning signal line GL1-1 in response to the output go1 finally.

To distinguish the order of scanning shown in FIG. 6A and the order of scanning shown in FIG. 6B, the scanning signal line drive circuit 58 provides an instruction signal or the like and sets the scanning direction to the normal direction and the reverse direction. Here, when the number of output lines is 240 or more, the setting of a starting position for outputting and the effective number of output lines are set in response to the instruction signal or the like.

Figure 7A:
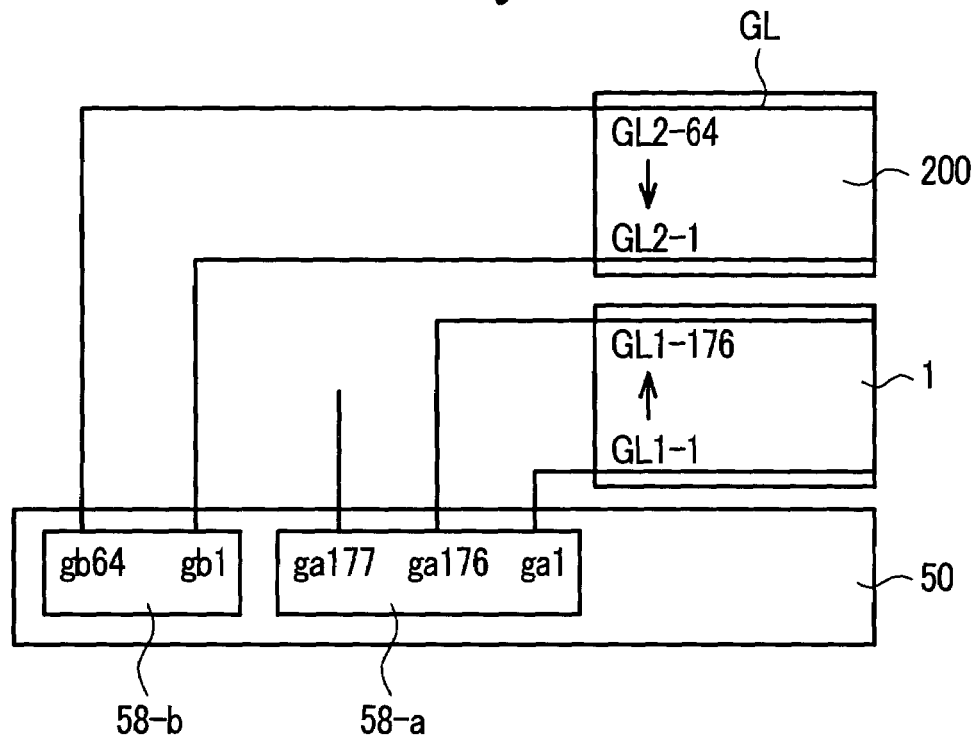
FIG. 7A and FIG. 7B are diagrams showing the driving method for supply of scanning signals used in the liquid crystal display device of the present invention.
Figure 7B:
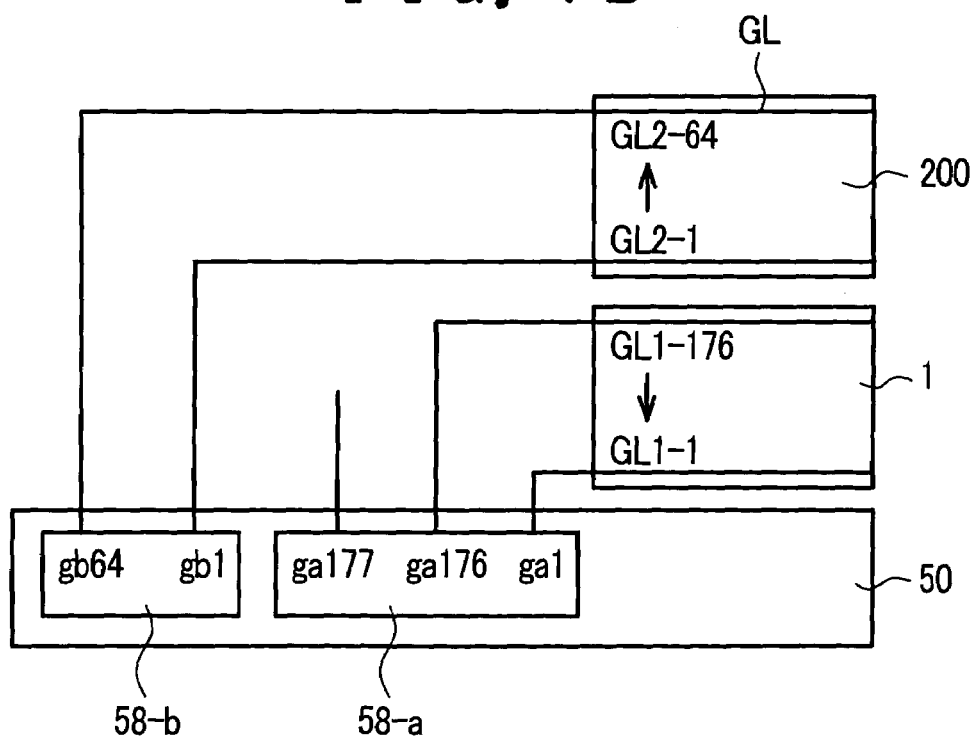

Next, FIGS. 7A and 7B shows a case in which the scanning direction of the liquid crystal display panel 1 and the scanning direction of the liquid crystal display panel 200 are different from each other. In this case, the scanning signal line drive circuit 58 is divided into scanning signal drive parts 58-*a*, 58-*b*, and the scanning directions are set to the normal direction and the reverse direction. Further, one side at which scanning is started first is set; and, after confirming the completion of scanning at one side, scanning at another side is started.

Further, as indicated by symbol gal 77, when there exist excessive outputs which are not connected to the scanning signal lines, the effective number of scanning lines of the scanning signal line drive part 58-*a* is set to 176 and the scanning signal line drive part 58-*b* is informed of the completion of scanning by the scanning signal line drive part 58-*a* by counting the scanning 176 times using a counter or the like. Here, the reason that the number of scanning signal lines is set to disagree with the number of output lines is to enable the drive circuit 50 to cope with plural types of liquid crystal display panels. That is, this provision is made to allow the drive circuit 50 to universally cope with a plurality of liquid crystal display panels which differ in the number of scanning signal lines.

In FIG. 7B, in the scanning signal line drive part 58-*a*, outputting starts at 2, the effective number of scanning lines is 176 and the scanning direction is set to the reverse direction. The scanning signal line drive part 58-*a* counts the number of scanning lines by the scanning signal line drive part 58-*b* and starts outputting in response to output gal 76 (second outputting in the reverse direction) after confirming counting of the effective number of scanning lines at 64 by the scanning signal line drive part 58-*b*.

In this manner, when two liquid crystal display panels are driven, the scanning direction and the scanning order can be selected in a plural number of combinations depending on the arrangement, wherein the scanning direction, the scanning order and the like can be set in response to an instruction signal or the like to cope with respective cases.

Next, a booster circuit will be explained. In miniaturized portable equipment, such as a mobile telephone or the like, a battery is generally used as a power source. Further, in view of respective amounts of various batteries which are available on a market, batteries having an output voltage of about 1.5V to 4V are used.

Figure 8:
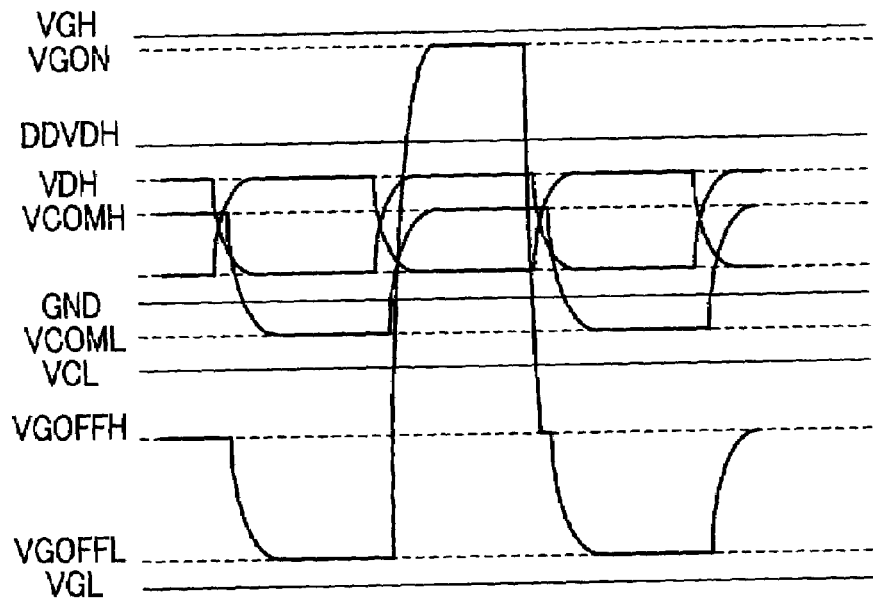
FIG. 8 is a timing chart showing voltage levels of signals used in a liquid crystal display device of the present invention.

Accordingly, the power source voltage for a liquid crystal display device is generated using a booster circuit. FIG. 8 shows the power source voltage necessary for a thin film transistor type liquid crystal display device. FIG. 8 shows respective driving voltages, when a so-called common voltage inversion driving method is used, in which common voltages VCOM, which are supplied to the counter electrodes 15 of the liquid crystal display panels 1 and 200, are inverted at a fixed period.

In FIG. 8, VGON indicates a High voltage of the scanning signal VG for turning on the thin film transistor 10 (TFT) of the pixel portion, and about 7.5V is necessary as the High voltage VGON. Further, VGOFF is a voltage for turning off the thin film transistor and a Low voltage of the scanning signal VG. About −5.5V is necessary as the low voltage VGOFF. VGH is a High power source for the scanning signal line drive circuit 58 (gate driver), which outputs the scanning signal VG, and VGL is a Low power source for the scanning signal line drive circuit 58. Since the High voltage VGON of the scanning signal is about 7.5V, the High power source VGH for the scanning signal line drive circuit 58 assumes 8V; while, since the Low voltage VGOFF of the scanning signal is about −5.5V, the Low power source VGL for the scanning signal line drive circuit 58 is required to assume −6V.

VDH is a gray scale reference voltage. The video signal line drive circuit (source driver) 57 generates the gray scale voltage using the gray scale reference voltage VDH as a reference. It is necessary to set the gray scale reference voltage VDH to about 5.0V in view of the characteristics of the liquid crystal material. DDVDH is the power source voltage for the drive circuit 50. Since the gray scale reference voltage VDH which the video signal line drive circuit 57 generates is 5.0V and the maximum rated voltage of the video signal line drive circuit 57 is 6V, it is necessary to set the power source voltage DDVDH for the drive circuit 50 to about 5.5V.

VCOMH is a High voltage for the counter electrode, and VCOML is a Low voltage for the counter electrode. It is necessary to set the High voltage VCOMH for the counter electrode to 5V or less, while it is necessary to set the Low voltage VCOML for the counter electrode to −2.5V. VCL is a voltage generating power source for the counter electrode and constitutes a power source voltage for generating the Low voltage VCOML for the counter electrode. It is necessary to set the voltage generating power source VCL for the counter electrode to about −3V in view of an operational margin of the VCOML generating circuit.

In the above-mentioned power sources provided for the liquid crystal display device, the power source voltage DDVDH for the drive circuit 50, the High power source VGH for the scanning signal line drive circuit 58, the low power source VGL for the scanning signal line drive circuit 58, and the voltage generating power source VCL for the counter electrodes are generated using a charge pump type booster circuit, while other voltages are generated by dividing the voltages generated by the booster circuit or the like.

Figure 9A:
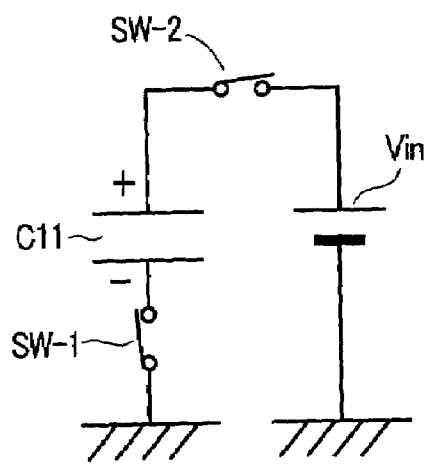
Figure 9B:
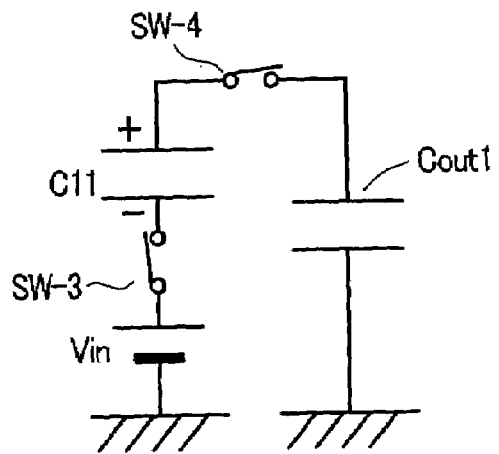

The operational principle of the charge pump type booster circuit will be briefly explained in conjunction with FIGS. 9A and 9B by taking twofold or double boosting as an example. A booster circuit is comprised of an input power source Vin, a booster capacitance C11, a holding capacitance Cout1 and changeover switches SW-1, SW-2, and it realizes the charge state shown in FIG. 9A and the discharge state shown in FIG. 9B by operation of a changeover switch.

First of all, in the charge state shown in FIG. 9A, one electrode of the booster capacitance C11 is connected to the GND potential via the changeover switch SW-1, and the other electrode of the booster capacitance C11 is connected to the input power source Vin via the changeover switch SW-2, so that the booster capacitance C11 is connected to the input power source Vin in parallel. Due to such a constitution, the charge corresponding to the input power source Vin is charged into the booster capacitance C11.

Subsequently, as seen in FIG. 9B, the input power source Vin is connected in series to the electrode of the booster capacitance C11 which was connected to the GND potential in FIG. 9A, so as to apply the input power source Vin thereto by operating the changeover switch SW-3. Here, the other electrode of the booster capacitance C11 assumes a voltage of 2×Vin which is twice as large as the input power source Vin. The holding capacitance Cout1 is connected to the booster capacitance C11 and the input power source Vin in parallel by operating the changeover switch SW-4. Due to such a constitution, the voltage of 2×Vin is held in the holding capacitance Cout1.

Here a case is considered in which, in the booster operation described with reference to FIGS. 9A and 9B, the power source voltage DDVDH (about 5.5V) for the video signal line drive circuit 57, the High power source VGH (about 7.5V) for the scanning signal line drive circuit 58, the Low power source VGL (about −6.0V) for the scanning signal line drive circuit 58, and the voltage generating power source VCL for the counter electrode (about −3V) are generated. Here, with respect to a mobile telephone, although the input power source Vin is often an output voltage of the power source battery, the input power source Vin implies a voltage supplied to the booster circuit, including the output voltage of the power source battery, in this specification.

Assuming that the input power source Vin is 3V, since the power source voltage DDVDH (about 5.5V) for the video signal line drive circuit 57 is about twice as high as the input power source Vin, a booster circuit which doubles the input power source Vin is necessary. Since such double boosting is not sufficient for the High power source VGH (about 7.5V) for the scanning signal line drive circuit 58, a booster circuit which can triple the input power source Vin is necessary. Since the Low power source VGL for the scanning signal line drive circuit 58 is about −6V, a booster circuit which magnifies the input power source Vin by −2 times becomes necessary. Since the voltage generating power source VCL for the counter electrode voltage is about −3V, a booster circuit which magnifies the input power source Vin by −1 time becomes necessary.

Figure 10:
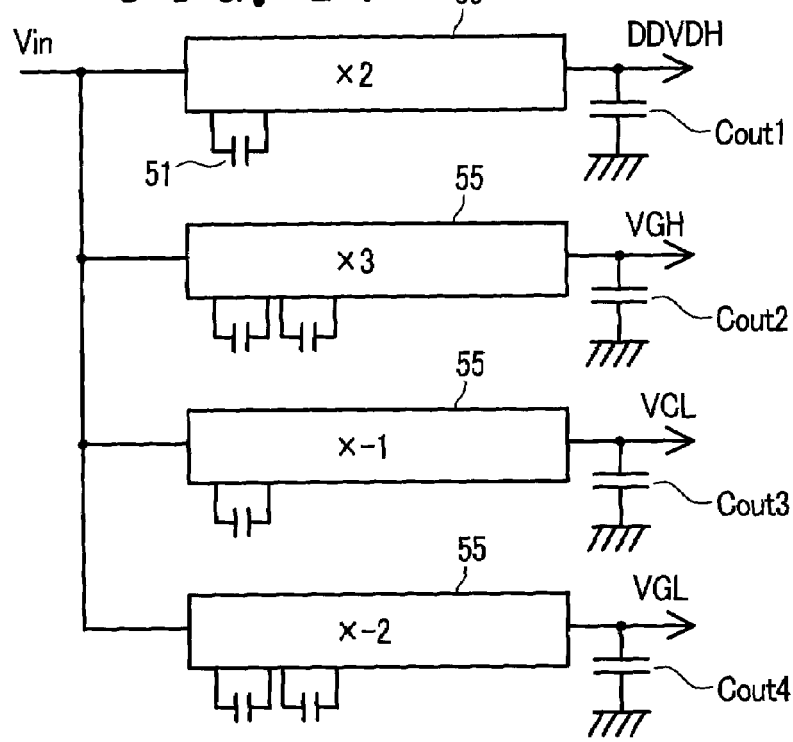
FIG. 10 is a schematic circuit diagram of a booster circuit used in the liquid crystal display device of the present invention.

FIG. 10 shows the constitution of the booster circuit 55 which magnifies the input power source Vin by 2 times, 3 times, −2 times and −1 time. When the input power source Vin is magnified by −2 times or −1 time, this is not boosting in a strict sense. Here, however, the term booster circuit refers to a circuit which generates a voltage different from that of an input voltage. With respect to the number of capacitors 51, six capacitors in total are necessary. That is, one capacitor is necessary in the circuit which doubles the input power source Vin, two capacitors are necessary in the circuit which triples the input power source Vin, two capacitors are necessary in the circuit which magnifies the input power source Vin by −2 times, and one capacitor is necessary in the circuit which magnifies the input power source Vin by −1 time. In this manner, in the circuit shown in FIG.

10, as externally mounted parts of the circuit, a large number of capacitors 51 are used. When the number of mounting parts is increased, there arises a problem in that the part mounting area is increased. Here, symbols Cout1 to Cout4 in the drawing indicate holding capacitances for holding output voltages.

Figure 11:
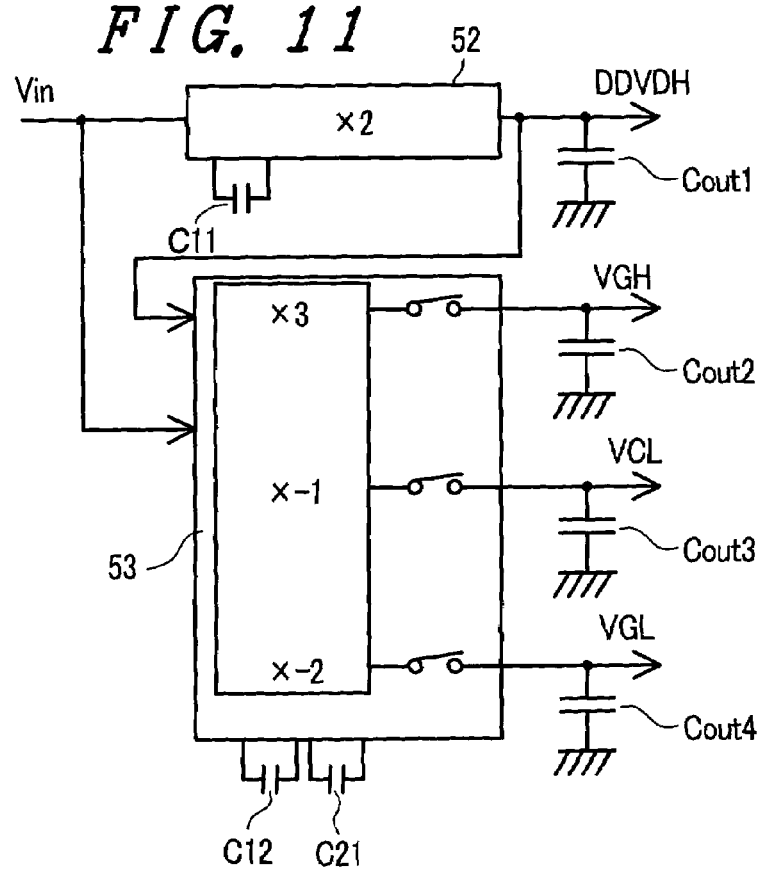
FIG. 11 is a schematic circuit diagram of a booster circuit used in the liquid crystal display device of the present invention.

FIG. 11 is a conceptual block diagram of a circuit in which it is possible to decrease the number of externally mounted capacitors 51 by making use of the output of the booster circuit 55 as a input power source and by using some of the externally mounted capacitors 51 in common. In the circuit shown in FIG. 11, as the externally mounted capacitors, three capacitors consisting of an externally mounted capacitor C11 connected to the booster circuit 52 and two externally mounted capacitors C12, C21 connected to the booster circuit 53, are necessary. With respect to the circuit shown in FIG. 10, the number of externally mounted capacitors can be reduced from 6 elements to 3 elements. Here, the externally mounted capacitor C11 is provided for boosting by 2 times, the externally mounted capacitor C12 is provided in common for boosting by 3 times and −1 times, and the externally mounted capacitors C21 is provided for boosting by −2 times.

Figure 12A:
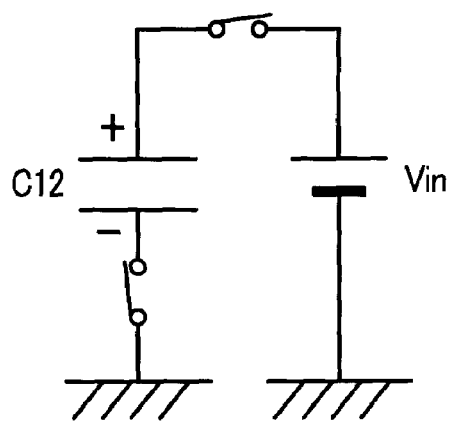
FIG. 12A, FIG. 12B and FIG. 12C are schematic circuit diagrams of booster circuits used in the liquid crystal display device of the present invention.
Figure 12B:
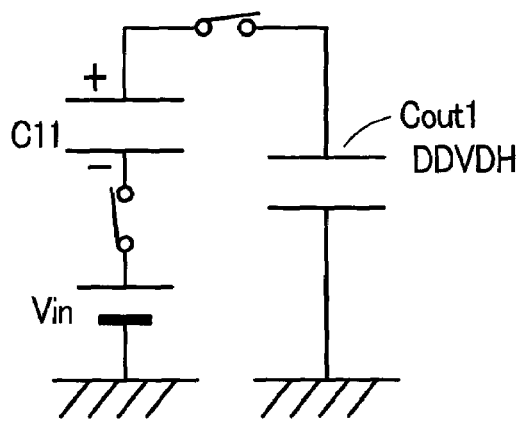
Figure 12C:
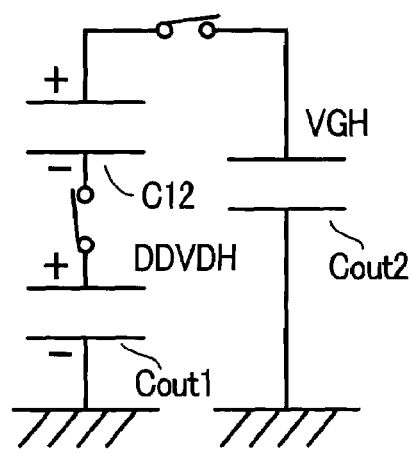

An operation to triple the input power source Vin of the booster circuit 53 shown in FIG. 11 will be explained in conjunction with FIGS. 12A to 12C. In FIG. 12A, the booster capacitance (externally mounted capacitor) C12 is charged using the input power source voltage Vin. Further, FIG. 12B shows a booster circuit 52 in which the voltage DDVDH, which is twice as high as the input power source voltage Vin, is produced, as was explained in conjunction with FIG. 9B. In the circuit shown in FIG. 12C, by making use of the voltage DDVDH, which is obtained by doubling the input power source voltage Vin, the number of externally mounted capacitors is reduced. As shown in FIG. 12C, using the voltage DDVDH, which constitutes the output of the holding capacitance Cout 1, the holding capacitance Cout1 and the booster capacitance C12 are connected in series, thus generating a voltage which is three times as high as the input power source Vin.

Figure 13A:
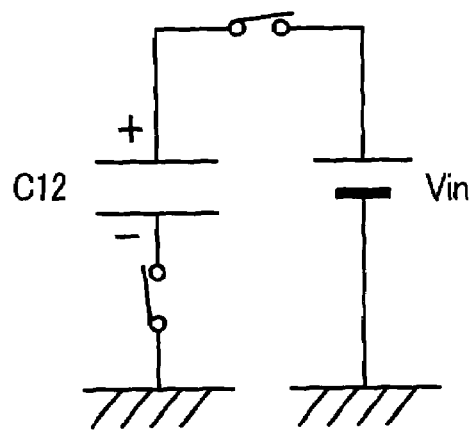
FIG. 13A and FIG. 13B are schematic circuit diagrams of booster circuits used in the liquid crystal display device of the present invention.
Figure 13B:
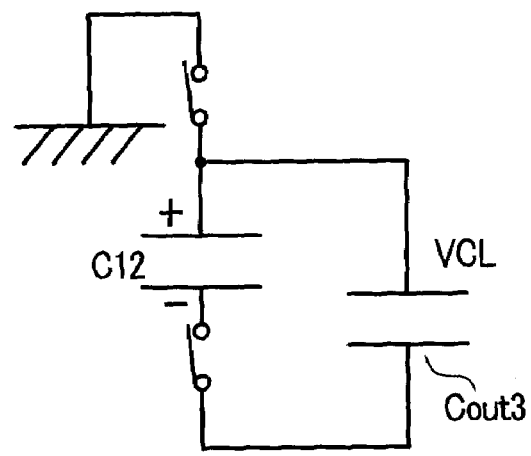

Next, an operation to boost the input power source Vin by −1 time will be explained in conjunction with FIGS. 13A and 13B. In FIG. 13A, the booster capacitance C12 is charged to the voltage Vin using the input power source Vin. Thereafter, in FIG. 13B, by connecting the positive-polarity-side electrode of the booster capacitance 12 to the GND potential, the voltage VCL, having the polarity thereof inverted from that of the input power source Vin, is generated. Then, by connecting the booster capacitance C12 and the holding capacitance Cout4 in parallel, the voltage VCL which is obtained by magnifying the input power source Vin by −1 time is held in the holding capacitance Cout3. In the circuit shown in FIG. 13B, by using the externally mounted capacitor C12, that is used in the circuit for boosting the voltage by three times in FIG. 12c, in common, the number of capacitors C12 is reduced.

Figure 14A:
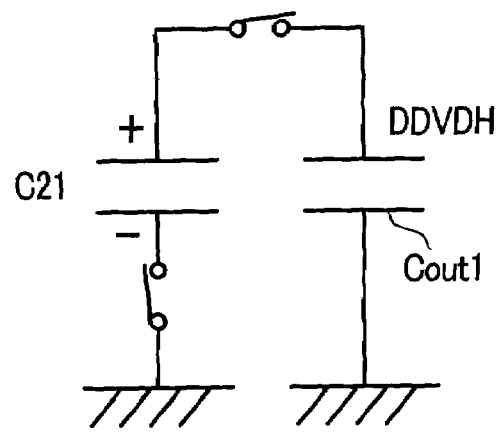
FIG. 14A and FIG. 14B are schematic circuit diagrams of booster circuits used in the liquid crystal display device of the present invention.
Figure 14B:
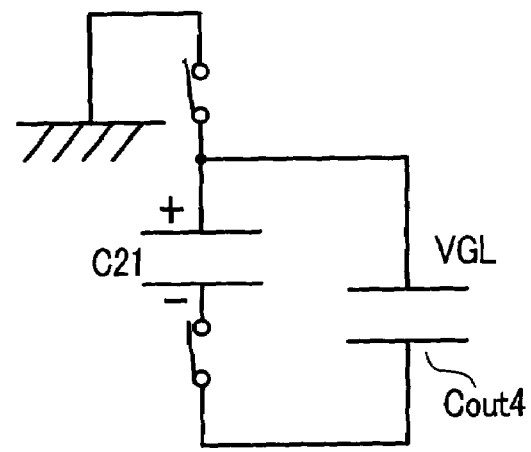

Next, an operation for magnifying the input power source Vin by −2 times will be explained in conjunction with FIGS. 14A and 14B. In FIG. 14A, the booster capacitance C21 is charged to the voltage DDVDH using the voltage DDVDH which constitutes the output of the holding capacitance Cout1 of the booster circuit 52. Thereafter, in FIG. 14B, by connecting the positive-polarity-side electrode of the booster capacitance 21 to the GND potential, the voltage VGL having the polarity thereof inverted from that of the voltage DDVDH is generated. Then, by connecting the booster capacitance C21 and the holding capacitance Cout4 in parallel, the voltage VGL which is obtained by magnifying the input power source Vin by −2 times is held in the holding capacitance Cout4.

In this manner, in the booster circuit shown in FIG. 11, by making use of the boosted voltage which is held by the holding capacitance Cout1, certain capacitors can be omitted, and, hence, the number of parts can be reduced. Further, in the circuits shown in FIGS. 13A, 13B and FIGS. 14A, 14B, by inverting the connection between the negative-polarity-side voltage and the capacitor and by making use of the input power source Vin in addition to the boosted voltage of the holding capacitance, the capacitors can be used in common, and, hence, the number of parts is reduced. To explain the constitution which enables the omission of a number of the capacitors and the common use of capacitors, the liquid crystal display device has a plurality of power sources peculiar to the liquid crystal display device, that is, the power source voltage DDVDH for the video signal line drive circuit 57, the High power source VGH for the scanning signal line drive circuit 58, the Low power source VGL for the scanning signal line drive circuit 58, and the voltage generating power source VCL for the counter electrode; and, the liquid crystal display device also has negative-polarity side voltages. Accordingly, by making time-division use of the booster capacitances C12, C21, C22, it is possible to use them in common among a plurality of booster circuits or to make use of the boosted voltage.

Figure 15:
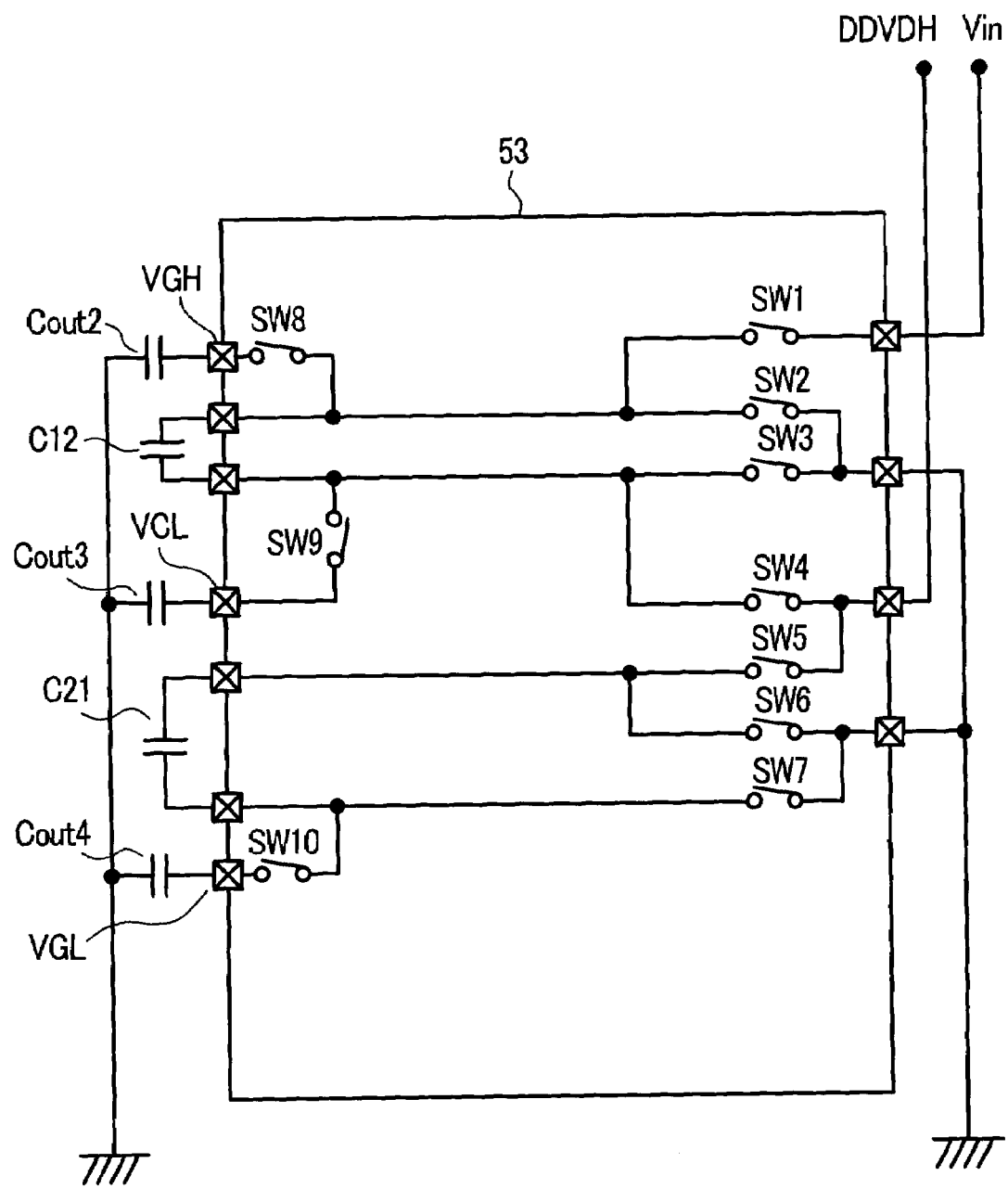
FIG. 15 is a schematic circuit diagram of a booster circuit used in the liquid crystal display device of the present invention.

FIG. 15 shows the more specific constitution of the booster circuit 53 shown in FIG. 11. Operation of the booster circuit 53 will be explained hereinafter in conjunction with the timing chart shown in FIG. 16. First of all, a method of realizing the operation shown in FIG. 12 for generating the voltage VGH will be explained. To obtain the circuit operation shown FIG. 12A, the switch SW1 and the switch SW3 shown in FIG. 15 are turned on. When the switch SW1 and the switch SW3 are turned on, the voltage of the input power source Vin is charged to the booster capacitance C12. At this point of time, as in the case of the circuit shown in FIG. 12B, the voltage DDVDH is outputted from the booster circuit 52. Subsequently, to obtain the circuit operation shown in FIG. 12C, the switches SW1 and the switch SW3 shown in FIG. 15 are turned off, while the switch SW4 shown in FIG. 15 is turned on, so as to apply the voltage DDVDH to the booster capacitance C12. At the same time, the switch SW8 is turned on to charge the holding capacitance Cout2. In this manner, a voltage which is three times as high as the input power source Vin is held in the holding capacitance Cout2.

Now, operation of the circuit shown in FIGS. 13A, 13B will be explained. To obtain the circuit operation shown in FIG. 13A, the switch SW1 and switch SW3 in FIG. 15 are turned on so as to charge the booster capacitance C12 with the input power source Vin. Subsequently, the switch SW1 and the switch SW3 are turned off and the switch SW2 is turned on, thus inverting the polarities of the voltages; and, further, the switch SW9 is turned on to charge the holding capacitance Cout3. In this manner, the voltage obtained by magnifying the input power source Vin by −1 time is held in the holding capacitance Cout3.

Now, operation of the circuit shown in FIGS. 14A, 14B will be explained. To obtain the circuit operation shown in FIG. 14A, the switch SW5 and switch SW7 in FIG. 15 are turned on so as to charge the booster capacitance C21 with the voltage DDVDH. Subsequently, the switch SW5 and the switch SW7 are turned off and the switch SW6, is turned on thus inverting the polarities of the voltages; and, further, the switch SW10 is turned on to charge the holding capacitance Cout4.

Figure 16:
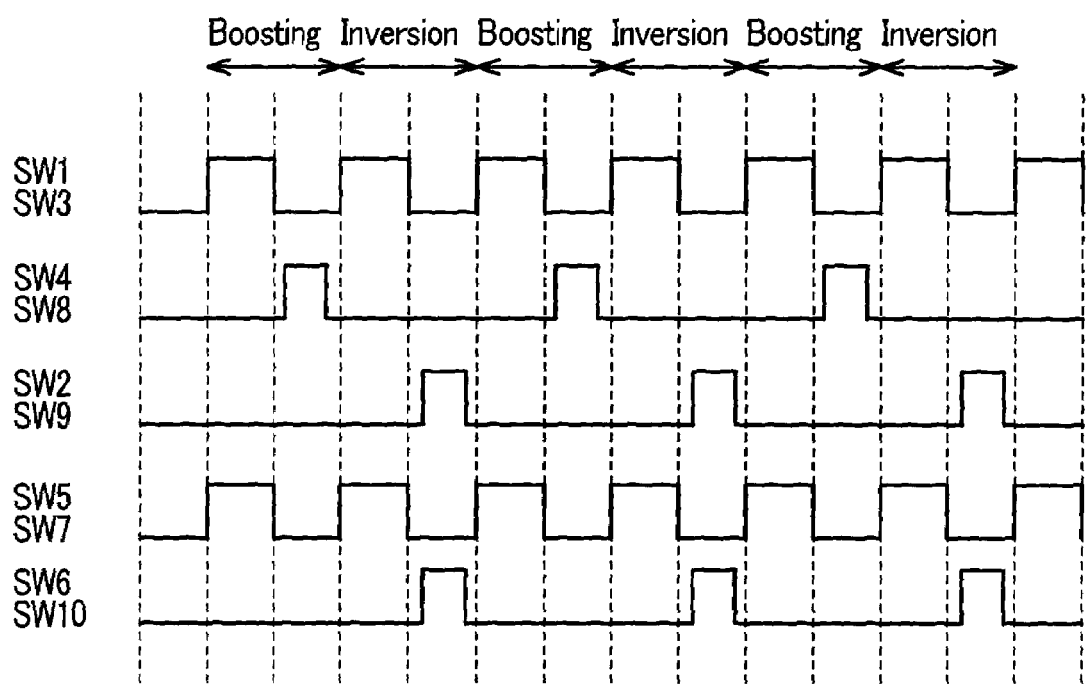
FIG. 16 is a timing chart showing the operation of a booster circuit used in the liquid crystal display device of the present invention.

As described above, in the circuit shown in FIG. 15, the booster capacitances C12, C21 are used in common by time division. Further, as shown in FIG. 16, the booster capacitances C12, C21 are repeatedly charged in response to the operation of the switches SW1, SW3, SW5 and SW7, are used for the boosting operation in response to the operation of the switches SW4 and SW8, and are further used for inversion (boosting) operation in response to the operation of the switches SW2, SW9, SW6 and SW10. In this manner, by enabling the common use of the booster capacitances C12 and C21 in a time-division manner, the number of externally mounted capacitors can be reduced; and, hence, the number of parts of a liquid crystal display device can be reduced.

Although the booster circuit shown in FIG. 15 is sufficient for outputting a set voltage, it is difficult for the booster circuit to change the output voltage. Along with the widespread use of mobile telephones, the liquid crystal display panels which are available become diverse; and, hence, the requested voltages also take on diverse values. Further, the demand for reduction of the manufacturing cost is strong; and, hence, it is desirable that the booster circuits are also formed of products that are available for general use.

Figure 17:
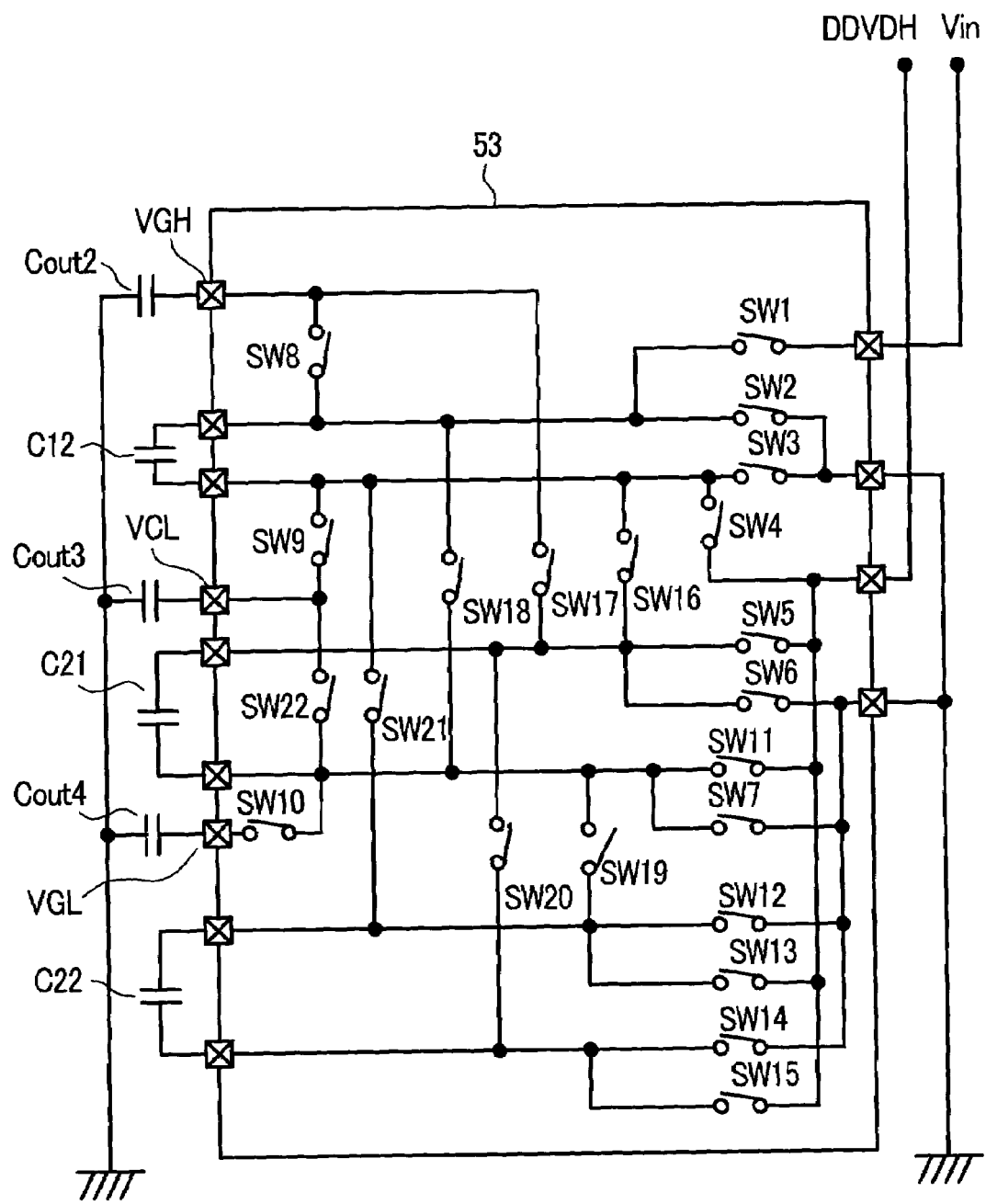
FIG. 17 is a schematic circuit diagram of a booster circuit used in the liquid crystal display device of the present invention.

Accordingly, a circuit is provided, as shown in FIG. 17, which can change the magnification of the booster circuit by changeover of switches. The change of magnification can be set in response to instruction signals or the like.

Figure 18A:
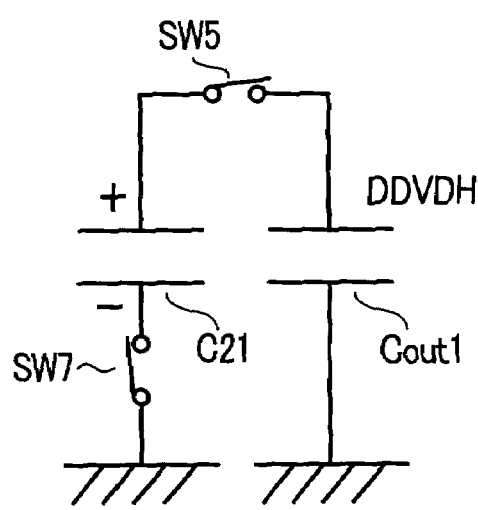
FIG. 18A and FIG. 18B are schematic circuit diagrams of booster circuits used in the liquid crystal display device of the present invention.
Figure 18B:
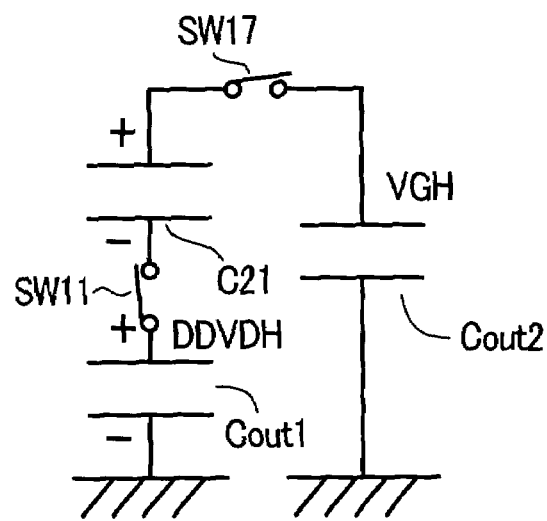

The operation of the circuit shown in FIG. 17 will be explained hereinafter in conjunction with FIG. 18A to FIG. 21D. FIGS. 18A, 18B illustrate the manner of operation when the High power source VGH for the scanning signal line drive circuit 58 is obtained by magnifying the input power source Vin by 4 times. Here, it is assumed that, as the voltage DDVDH, a voltage which is twice as high as the input power source Vin is produced by the booster circuit 52.

When a switch SW5 in the circuit shown in FIG. 17 is turned on so as to apply the voltage DDVDH to one electrode of a capacitor C21 and a switch SW7 is turned on so as to connect another electrode of the capacitor C21 to ground, the circuit shown in FIG. 18A is obtained. Thereafter, when the switches SW5 and SW7 are turned off and the switches SW11 to SW17 are turned on, the circuit shown in FIG. 18B is obtained. Hence, a voltage which is 4 times as high as the input power source Vin is held in the capacitor Cout12.

Figure 19A:
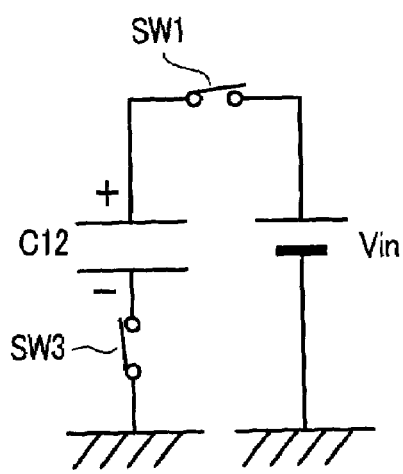
FIG. 19A, FIG. 19B and FIG. 19C are schematic circuit diagrams of booster circuits used in the liquid crystal display device of the present invention.
Figure 19B:
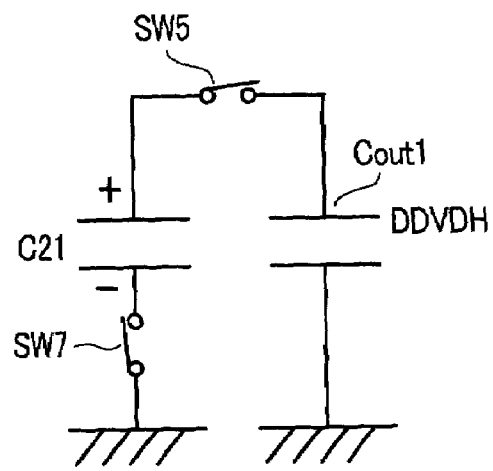
Figure 19C:
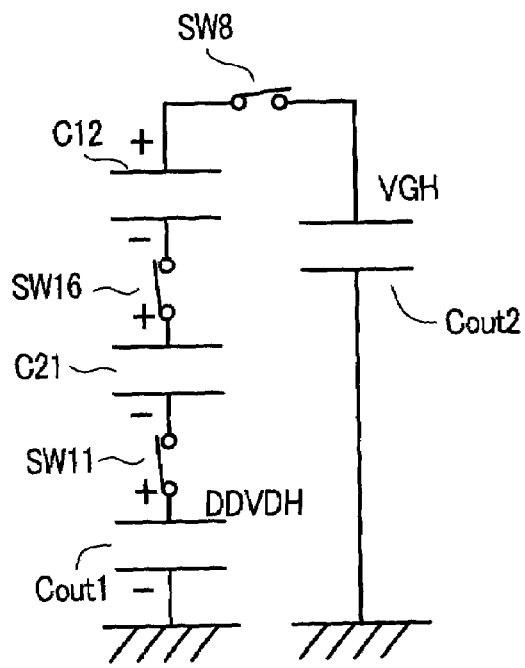

FIGS. 19A to 19C illustrate the manner of operation when the High power source VGH for the scanning signal line drive circuit 58 is obtained by magnifying the input power source Vin by 5 times. The voltage of the input power source Vin is held by the capacitor C12 in FIG. 19A the voltage DDVDH is held in the capacitor C21 in FIG. 19B; and the capacitor C12, the capacitor C21 and the voltage DDVDH are connected in series in FIG. 19C, so as to obtain a voltage which is 5 times as high as the input power source Vin. Here, the capacitor C12 and the capacitor C21 are connected in series by the switch SW16.

Figure 20A:
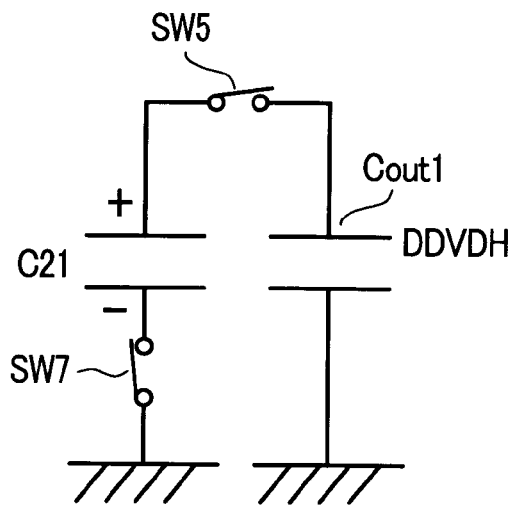
FIG. 20A, FIG. 20B and FIG. 20C are schematic circuit diagrams of booster circuits used in the liquid crystal display device of the present invention.
Figure 20B:
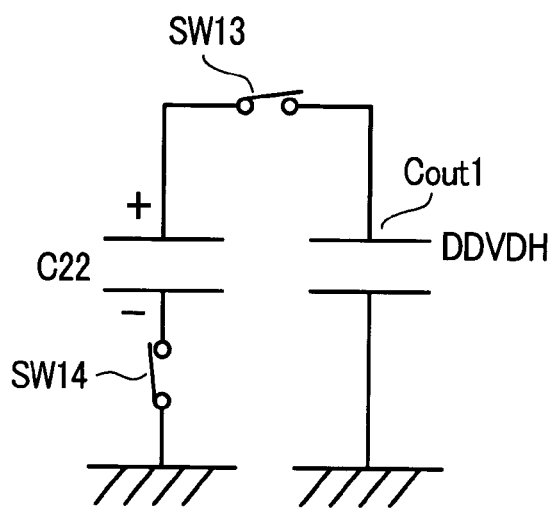
Figure 20C:
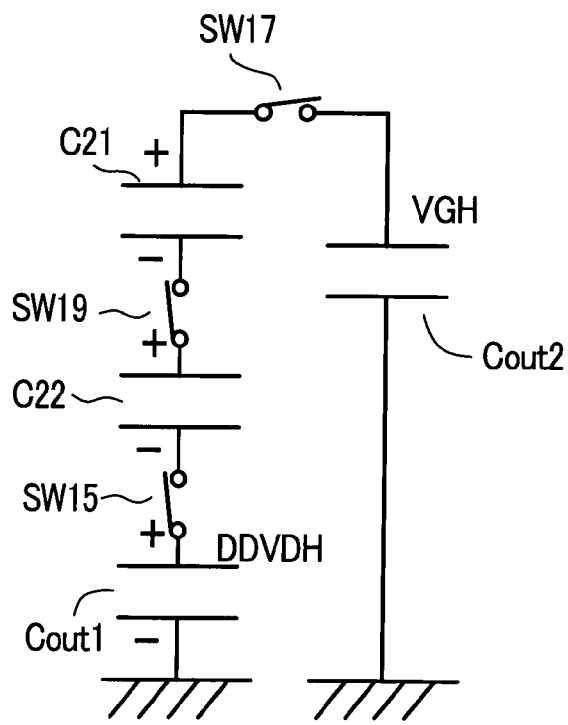

FIGS. 20A to 20C illustrate the manner of operation when the High power source VGH for the scanning signal line drive circuit 58 is obtained by magnifying the input power source Vin by 6 times. However, as shown in FIG. 20B, by adding the capacitor C22, the voltage value which can be boosted is increased. In FIG. 20C, the capacitor C21 and the capacitor C22 are connected in series by a switch SW19; and, further, the capacitor C22 and the voltage DDVDH are connected in series by a switch SW15, thus obtaining a voltage which is 6 times as high as the input power source Vin.

Figure 21A:
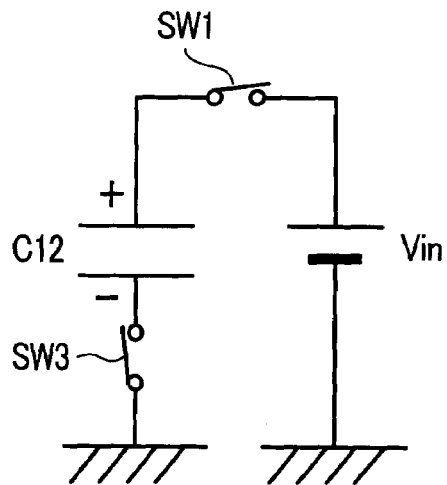
FIG. 21A, FIG. 21B, FIG. 21C and FIG. 21D are schematic circuit diagrams of booster circuits used in the liquid crystal display device of the present invention.
Figure 21B:
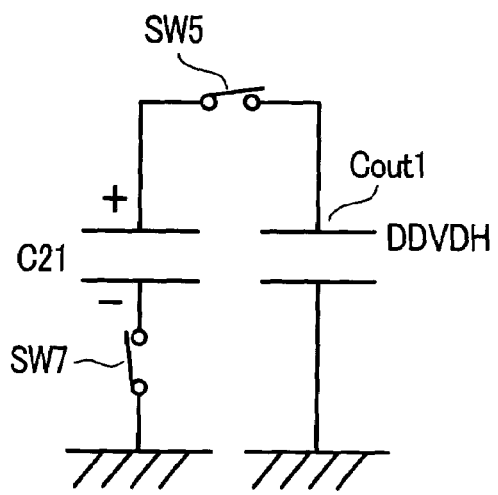
Figure 21C:
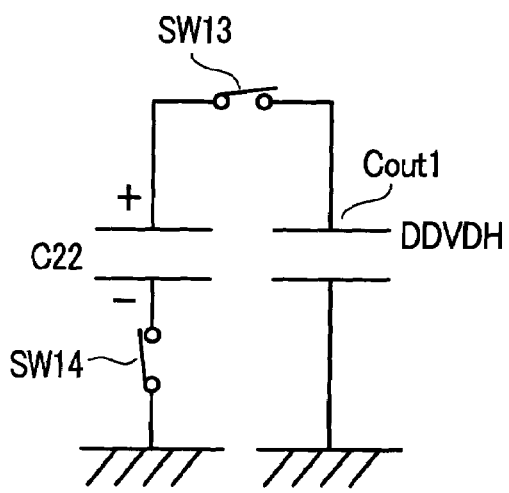
Figure 21D:
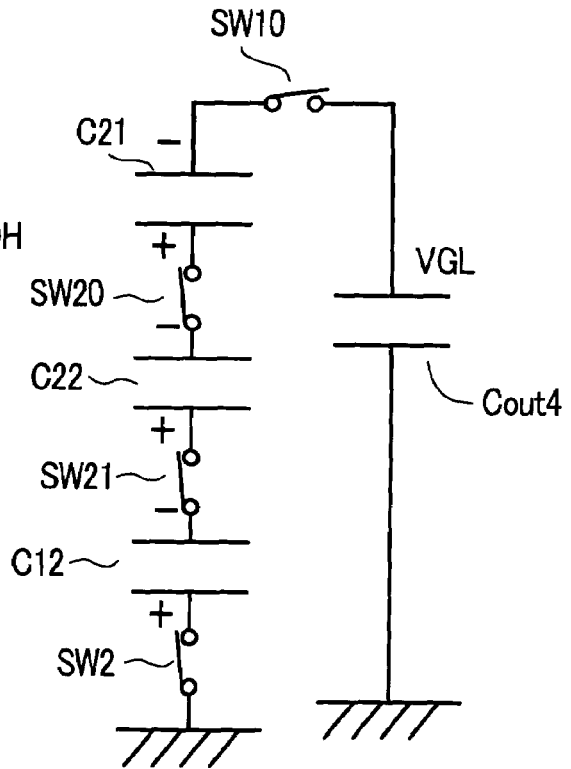

FIGS. 21A to 21C illustrate the manner of operation when the Low power source VGL for the scanning signal line drive circuit 58 is obtained by magnifying the input power source Vin by −5 times. FIG. 21A shows a mode in which the voltage of the power source Vin is held by the capacitor C12; FIG. 21B shows a mode in which the voltage DDVDH is held by the capacitor C21; and FIG. 21C shows a mode in which the voltage DDVDH is held by the capacitor C22. In FIG. 21D, the capacitors which hold respective voltages are connected in series with reverse polarities so as to obtain a voltage which is −5 times as high as the input power source Vin. In this manner, by connecting the externally mounted capacitors in series, it is possible to obtain a voltage which is a desired number of times as high as the input power source Vin.

However, in the circuit represented in FIGS. 21A to 21D, all externally mounted capacitors are connected in series simultaneously, and, hence, there arises a problem in that only one voltage can be obtained at a time. Accordingly, although the use of the circuit in a time-division manner can be considered sufficient to obtain a plurality of voltages, this also gives rise to a problem in that the current value which can be supplied is decreased when the circuit is used in time division.

Further, the inventors of the present invention have found a drawback in that the circuit is short of driving ability of the voltage generating power source VCL for counter electrodes. Accordingly, while ensuring outputting of the voltage generating power source VCL for counter electrodes from the booster circuit shown in FIG. 17, a booster circuit dedicated to the voltage generating power source VCL for counter electrodes is added. That is, the circuit is configured such that when the voltage generating power source VCL for counter electrodes requires a large driving ability, a dedicated booster circuit is used; while, when the voltage generating power source VCL for counter electrodes does not require a large driving ability, a booster circuit with a small number of externally mounted capacitors can be selected.

Figure 22:
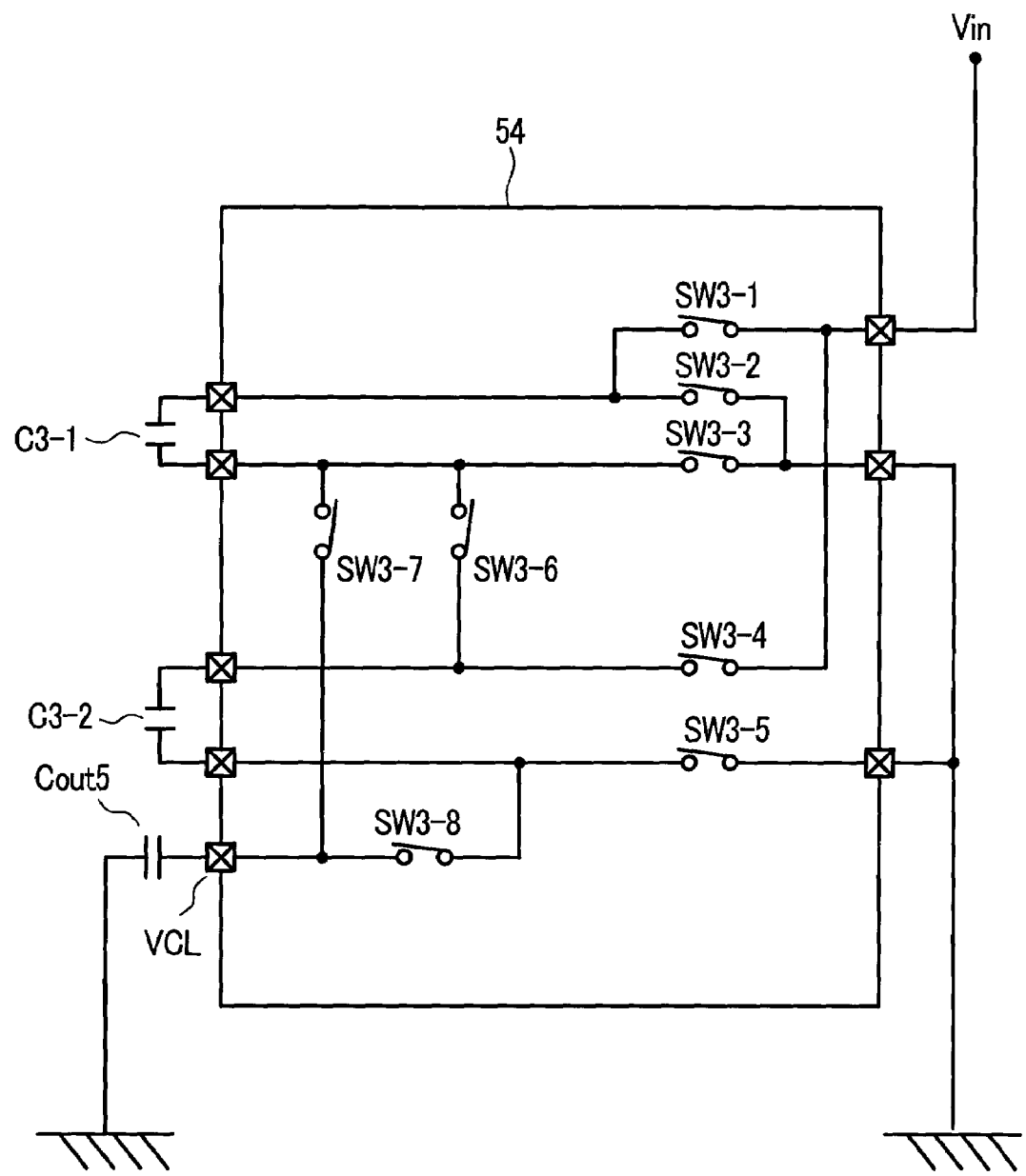
FIG. 22 is a schematic circuit diagram of a booster circuit used in the liquid crystal display device of the present invention.

FIG. 22 shows a booster circuit dedicated for the use as voltage generating power source VCL for the counter electrodes. In the circuit shown in FIG. 22, as externally mounted capacitors, two capacitors consisting of a capacitor C3-1 and a capacitor C3-2 can be connected. By turning on the switches SW3-1 and SW3-3, the voltage of the input power source Vin is held in the capacitor C3-1; and, thereafter, the switch SW3-2 is turned on to reverse the polarity, and, further, the input power source Vin is connected to a capacitor Cout5 through a switch SW3-7, whereby a voltage is obtained by magnifying the input power source Vin by −1 time.

Further, with the provision of the externally mounted capacitor C3-2, the voltage of the input power source Vin is also held in the capacitor C3-2 due to switches C3-4 and C3-5; and, thereafter, the capacitors C3-1 and C3-2 are connected in series through a switch SW3-6, and the input power source Vin is connected to the capacitor Cout5 by a switch SW3-8, whereby a voltage can be obtained by magnifying the input power source Vin by −2 times. As described above, according to the circuits described in conjunction with FIG. 15, FIG. 17 and FIG. 22, the magnification of the booster circuit can be selected in response to the voltage necessary for the liquid crystal display panel; and, hence, it is possible to obtain the necessary voltage by suitably providing necessary capacitors and switches.

Figure 23:
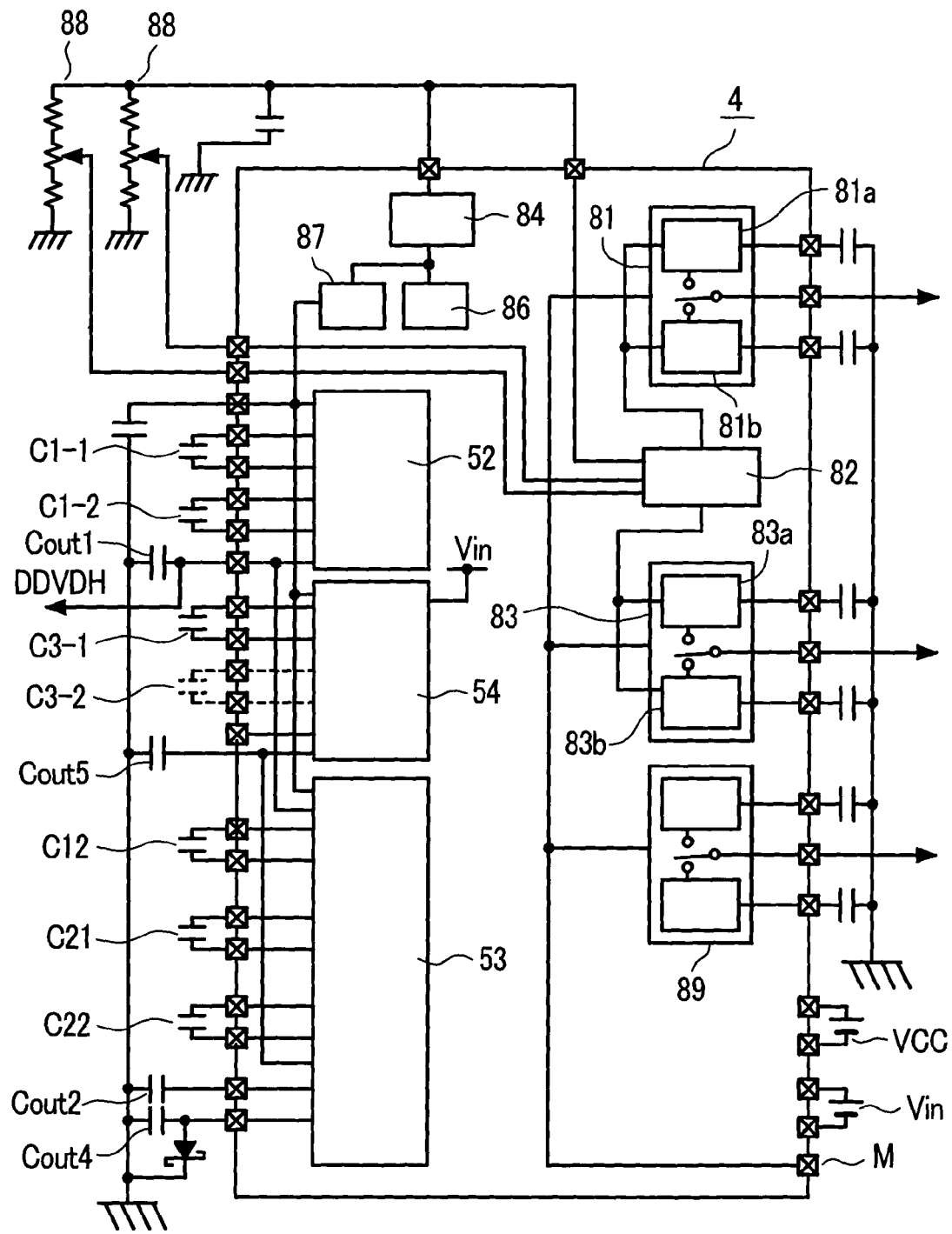
FIG. 23 is a schematic block diagram of a power source circuit used in the liquid crystal display device of the present invention.

Next, a power source circuit part 4 of the drive circuit 50 will be explained in conjunction with FIG. 23. FIG. 23 is a schematic diagram of the power source circuit part 4. In the drawing, numeral 81 indicates a counter electrode voltage outputting circuit for the main panel, numeral 82 indicates a level adjusting circuit, numeral 83 indicates a counter electrode voltage outputting circuit for the sub-panel, numeral 84 indicates a regulator, numeral 86 indicates an inner reference voltage generating circuit, numeral 87 indicates a reference voltage outputting circuit, and symbol M indicates an AC signal inputting terminal. A power source VCC provides a power source voltage of the drive circuit 50, and an output voltage from a battery is inputted in the same manner as the input power source Vin.

Figure 24:
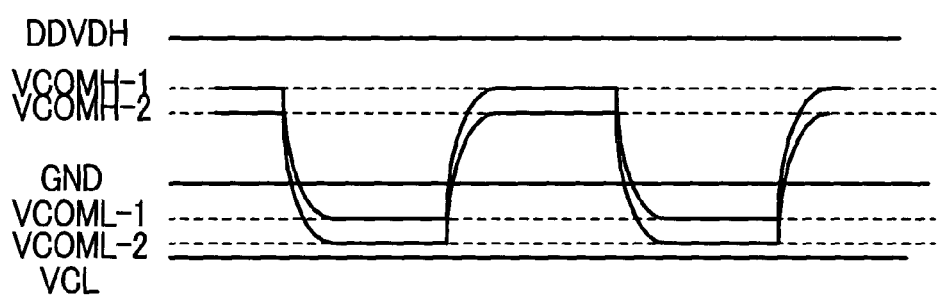
FIG. 24 is a timing chart showing voltage levels of common voltages used in the liquid crystal display device of the present invention.

The AC driving is performed in the above-mentioned manner. As one method for performing the AC driving, a so-called common inversion driving method is performed. In the circuit shown in FIG. 23, to enable common inversion driving, the counter electrode voltage outputting circuit 81 for the main panel and the counter electrode voltage outputting circuit 83 for the sub-panel are configured such that a voltage which is inverted at a fixed interval can be outputted. An AC signal is transmitted to the counter electrode voltage outputting circuit 81 for the main panel and the counter electrode voltage outputting circuit 83 for the sub-panel through an AC signal line 42, and the circuits 81 and 83 output a counter electrode High level voltage VCOMH and a counter electrode Low level voltage VCOML in response to the AC signal. FIG. 24 shows the output waveforms of the counter electrode voltage having the counter electrode High level voltage VCOMH-1 for the main panel, the counter electrode Low level voltage VCOML-1 for the main panel, the counter electrode High level voltage VCOMH-2 for the sub-panel, and the counter electrode Low level voltage VCOML-2 for the sub-panel.

Here, the amplitude adjusting circuit 82 determines the reference voltage amplitude, and respective voltages of the counter electrode voltage outputting circuit 81 for the main panel and the counter electrode voltage outputting circuit 83 for the sub-panel can be finely adjusted by semifixed resistances 88.

In the circuit shown in FIG. 23, from the regulator 84, as the counter electrode High level voltage VCOMH, the reference voltage is supplied to the level adjusting circuit 82. The level adjusting circuit 82 outputs the reference voltages, which are finely adjusted by the semifixed resistances 88 to a high level outputting part 81a of the counter electrode voltage outputting circuit 81 for main panel and a high level outputting part 83a of the counter electrode voltage outputting circuit 83 for the sub-panel, as the counter electrode voltages. Further, in the level adjusting circuit 82, the amplitude reference voltage is generated so as to assume the optimum amplitude; and, then, the amplitude reference voltage is deducted from the counter electrode High level voltage VCOMH so as to generate the counter electrode Low level voltage VCOML, and this voltage VCOML is outputted to a Low level outputting part 81b of the counter electrode voltage outputting circuit 81 for the main panel and a Low level outputting part 83b of the counter electrode voltage outputting circuit 83 for the sub-panel. The counter electrode voltage outputting circuit 81 for the main panel changes over the connection between the High level outputting part 81a and the Low level outputting part 81b in accordance with the AC signal and outputs the counter electrode High level voltage VCOMH-1 and the counter electrode Low level voltage VCOML-1. On the other hand, the counter electrode voltage outputting circuit 83 for the sub-panel changes over the connection between the High level outputting part 83a and the Low level outputting part 83b in accordance with the AC signal and outputs the counter electrode High level voltage VCOMH-2 and the counter electrode Low level voltage VCOML-2.

Here, the counter electrode voltage outputting circuit 81 for the main panel, the counter electrode voltage outputting circuit 83 for the sub-panel and the level adjusting circuit 82 are capable of changing the voltage values of the reference voltage and the amplitude reference voltage of the counter electrode based on the control from the controller. In the circuit shown in FIG. 23, the booster circuit 54 is dedicated to the voltage generating power source VCL for the counter electrode. Further, the booster circuit 52 includes two externally mounted capacitors CI-1 and CI-2, and it can output voltages which are respectively twice and three times as high as the input power source Vin as the voltage DDVDH. Further, when the scanning signal line GL is used as one electrode of the holding capacitance, a scanning signal OFF circuit 89 is provided in the same manner as the counter electrode voltage outputting circuits 81, 82 whereby the high-level side voltage VGOFFH and the low-level side voltage VGOFFL can be outputted also with respect to the voltage VGOFF at the low side of the scanning signal.

In a circuit shown in FIG. 23, a booster circuit 54 is provided, which is dedicated to the voltage generating power source VCL for counter electrodes, wherein the booster circuit 53 can stop the outputting of the voltage generating power source VCL for counter electrodes. When the driving ability of the power source VCL, due to the booster circuit 53, becomes short, it is possible to operate the booster circuit 54 dedicated to the voltage generating power source VCL for the counter electrodes. Further, provided that there is no problem, even when the image quality is low, outputting of the power source VCL from the booster circuits 53 and 54 is stopped, the counter electrode high-level voltage VCOMH is outputted from the counter electrode voltage outputting circuits 81, 82, and the counter electrode low-level voltage VCOML is not outputted, whereby a reduction of a power consumption can be realized.

Here, in the booster circuit 54 shown in FIG. 23, an externally mounted capacitor C3-2 (indicated by a dashed line in the drawing) is not provided and outputting is performed only by boosting the input power source Vin by −1 time using the externally mounted capacitor C3-1. In this manner, since an undesired booster voltage is present depending on the liquid crystal display panel, capacitors which are not necessary are omitted, thereby for reducing the number of parts.

Further, with respect to switches SW3-4, SW3-5 and the like, as shown in FIG. 22, when these switches are not necessary as the drive circuit 50, there may be a case in which these switches are not provided. That is, for realizing miniaturization and reduction of the power consumption, with respect to the number of mounting parts and the scale of the circuit, optimum values are selected corresponding to driven liquid crystal display panels. The drive circuit 50 is set corresponding to respective liquid crystal display panels in response to the instruction signals and the like, whereby optimum driving of the respective liquid crystal display panels can be realized.

Next, problems which may arise at the time of producing the power source voltage using the booster circuit will be explained. In producing the power source voltage using the booster circuit, the power source voltage does not assume a given voltage at the time of supplying the power source to the mobile telephone. Accordingly, the driving circuit 50 assumes the power source voltage state shown in FIG. 25. In the drawing, numeral 81 indicates a parasitic PNP bipolar transistor and numeral 82 indicates a NPN bipolartransistor. An NPNP thyristor and a PNPN thyristor are constituted of these parasitic bipolars transistor. When a Vin-DDVDH voltage and a GND-VGL voltage exceed threshold values VF of the thyristors and a potential inversion phenomenon such as Vin<DDVDH, VGL>GND is generated, the thyristors cannot be turned off. However, at the time of supplying the power source voltage, the power source voltage VGL assumes a potential equal to or more than the GND potential, and the power source voltage VDH of the drive circuit 5 also assumes a potential equal to or less than the input power source voltage Vin. Accordingly, there arises a latch-up phenomenon in which a large current flows between Vin-GND, and, hence, the thyristors cannot be turned off.

Figure 25:
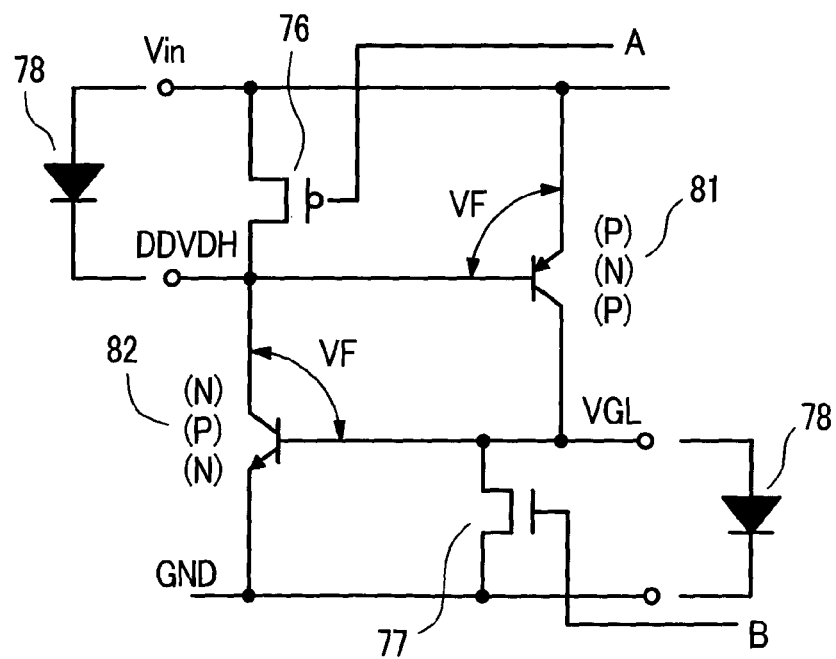
FIG. 25 is a circuit diagram for showing levels of power source voltages when the power source of the drive circuit used in the liquid crystal display device of the present invention is in the ON state.
Figure 26A:
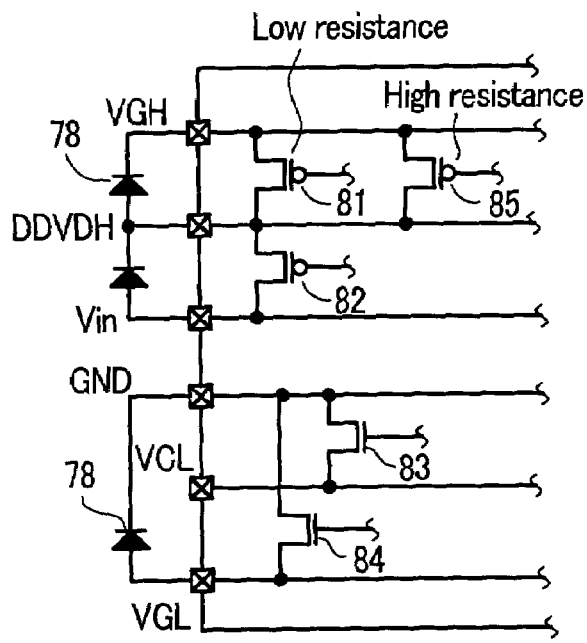
FIG. 26A is a schematic circuit diagram of a short-circuiting switch, showing the state when the power source of the drive circuit used in the liquid crystal display device of the present invention is in the ON state.
Figure 26B:
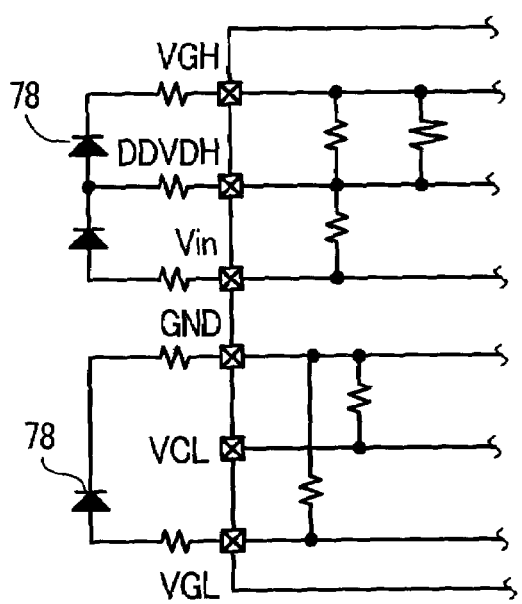
FIG. 26B is an equivalent circuit diagram of FIG. 26A.

Accordingly, to prevent the generation of such a latch-up phenomenon, as shown in FIG. 25, short-circuiting switches 76 and 77 are provided. FIG. 26A shows the constitution which provides a short-circuiting switch between respective power sources, and FIG. 26B shows an equivalent circuit when the short-circuiting switch is turned on. As shown in FIG. 26B, the short-circuiting switch has a resistance component, and, hence, the short-circuiting switch has the possibility of inducing a potential inversion phenomenon. Accordingly, the GND-VGL voltage is fixed using an externally mounted diode 78, such that the GVD-VGL voltage does not exceed the threshold value VF of the thyristor. However, with respect to the wiring formed on the liquid crystal display panel, the wiring resistance value is large, and, hence, there may arise a drawback in that the current which flows in the parasitic bipolar transistor cannot be absorbed by the externally mounted diode. Accordingly, to prevent the occurrence of a further potential inversion phenomenon, the power source ON sequence is taken into consideration.

Figure 27A:
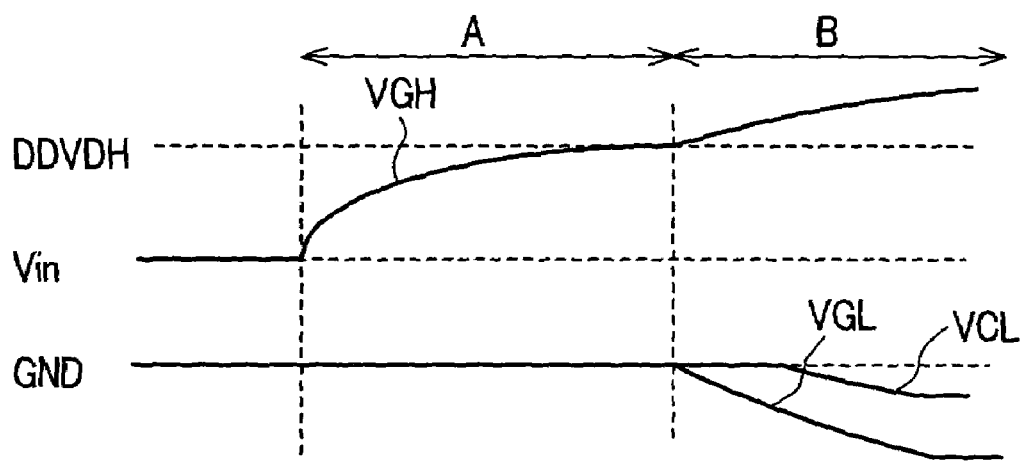
FIG. 27A is a waveform diagram showing levels of power source voltages when the power source of the drive circuit used in the liquid crystal display device of the present invention is in the ON state.

FIG. 27A shows the power source ON sequence. Here, as shown in FIG. 26B, between the power source DDVDH and the power source VGH, two switches consisting of a low resistance switch 81 and a high resistance switch 85 are provided. First of all, during a period A, the short-circuiting switch 82 between the power source DDVDH and the power source Vin is turned off and the short-circuiting switch 81 between the power source DDVDH and the power source VGH is turned on, so that the booster circuit 52 shown in FIG. 23 is operated and the power source DDVDH is started. At this point of time, the short-circuiting switch 81 between the power source DDVDH and the power source VGH is turned on, the level of the power source VGH assumes the level of the power source DDVDH. Here, the operation during the above-mentioned period A is determined based on AP bits of instruction signals, as will be described later.

Next, during a period B, the booster circuit 53 is operated so as to start the power source VGH and the power source VGL. Here, the power source VCL is delayed to prevent the potential inversion with the power source VGL. Alternatively, since the relationship VGH>DDVDH is established at this point of time, it is possible to operate the power sources VGL and VCL simultaneously. Due to the above-mentioned power source ON sequence, the power sources can be started without inverting respective potentials, so that it is possible to increase the margin of starting the power source circuit. The operation during the period B is determined based on PON bits of instruction signals.

Figure 27B:
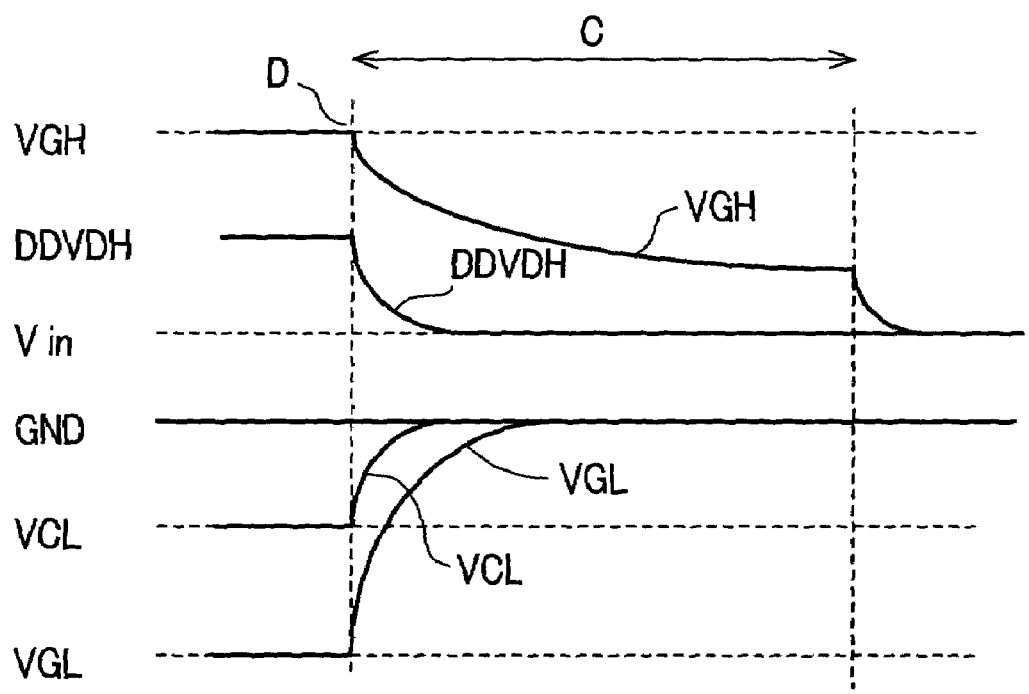
FIG. 27B is a waveform diagram of levels of power source voltages when the power source of the drive circuit used in the liquid crystal display device of the present invention is in the OFF state.

Next, the power source OFF sequence will be explained. With respect to a mobile telephone or the like, due to a sudden interruption of the original power source caused by slipping off of the battery or the like, there has been a drawback that an image retention phenomenon occurs on the screen. Accordingly, to obviate such image retention, power source OFF sequence becomes necessary. FIG. 27B shows the power source OFF sequence. First of all, assume that the supply of a voltage from the input power source Vin is stopped for some reason at a point of time D. During a period C, the power sources DDVDH, VCL and VGL are discharged so that they assume a state before starting the power source. Further, the counter electrode voltage VCOM output and the video signal line output also assume the GND level during the period C. Here, to discharge the charge in the pixel, it is necessary to make the thin film transistor 10 assume the ON state. Accordingly, to make the thin film transistor 10 assume the ON state, it is necessary to delay the discharge of the power source VGH compared to other power sources. Here, when the drive circuit 50 is reset in response to the reset signal described in conjunction with FIG. 28, the drive circuit 50 sets the value of GON bits of instruction signals, as will be explained later, and sets all outputs to the scanning signal lines at a high level.

Figure 28A:
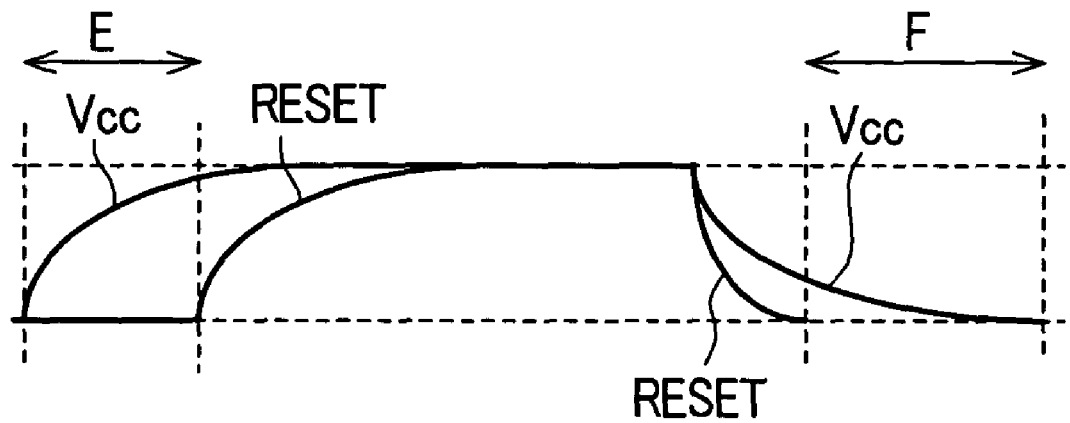
FIG. 28A is an output waveform chart of reset signals of the drive circuit used in the liquid crystal display device of the present invention.

In the power source ON sequence, it is desirable that a low resistance is provided between the power source DDVDH and the power source VGH. To the contrary, in the power source OFF sequence, it is desirable that the power source VGH assumes the high resistance to delay discharging. Accordingly, to enable the drive circuit 50 to recognize the power source ON time and the power source OFF time, a POWER ON RESET signal is used. Waveforms of the POWER ON RESET signal are shown in FIG. 28A. The POWER ON RESET signal has the characteristic that the signal rises in several ms after supplying the power source, when the liquid crystal display panel is turned on, wherein the POWER ON RESET signal resets the drive circuit 50 within the low period of several ms, and, thereafter, the signal rises and releases the resetting of the drive circuit 50. Here, although resetting is released with respect to the drive circuit 50, the inner state of the drive circuit is fixed and the state thereof is univocally determined.

Figure 28B:
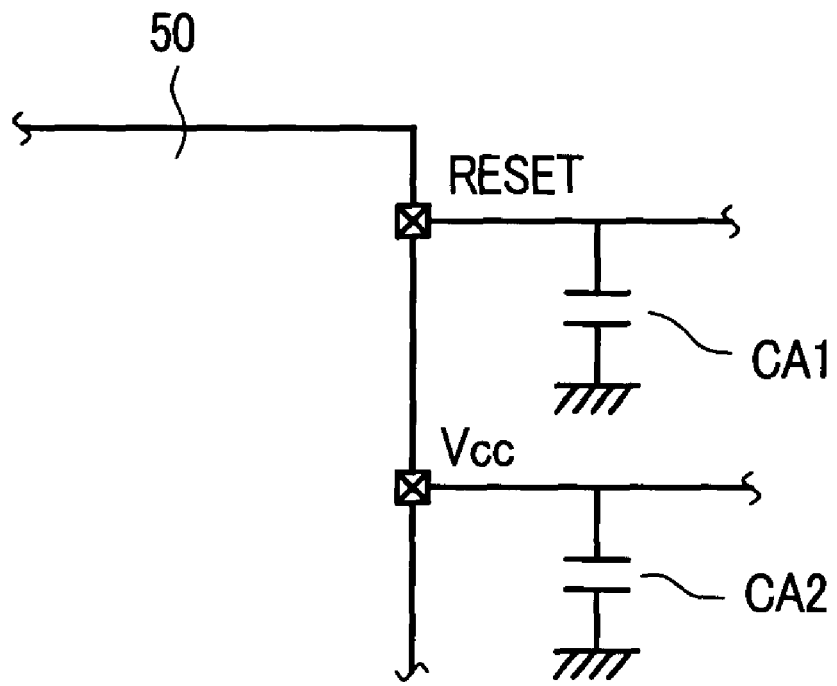
FIG. 28B is a schematic circuit diagram of the drive circuit.

To the contrary, at the time of turning off the power source, resetting is performed by making the state of discharge of respective power sources different from each other, based on capacitances connected to respective power source terminals. The liquid crystal display panel adopts a characteristic in which the capacitance of the capacitor CA1 of the circuit shown in FIG. 28B is set to be smaller than the capacitance of the capacitor CA2, so that a RESET signal rises before the power source voltage VCC. Due to such a constitution, in a state in which the charge remains in the power source VCC at the time of interruption of the power source, due to the falling of the RESET signal, it is possible to reset the drive circuit 50. Here, the power source voltage VCC is a power source voltage that is supplied to the drive circuit 50 from the outside.

In this manner, although it is possible to recognize ON and OFF operation of the power source by making use of the RESET signal, the drive circuit 50 enters the resetting operation in the RESET state, and, hence, the state of the drive circuit 50 is fixed univocally. Accordingly, to recognize ON and OFF state by making use of the RESET signal, a level sensing circuit is provided between the power source voltages DDVDH and VGH.

Figure 29:
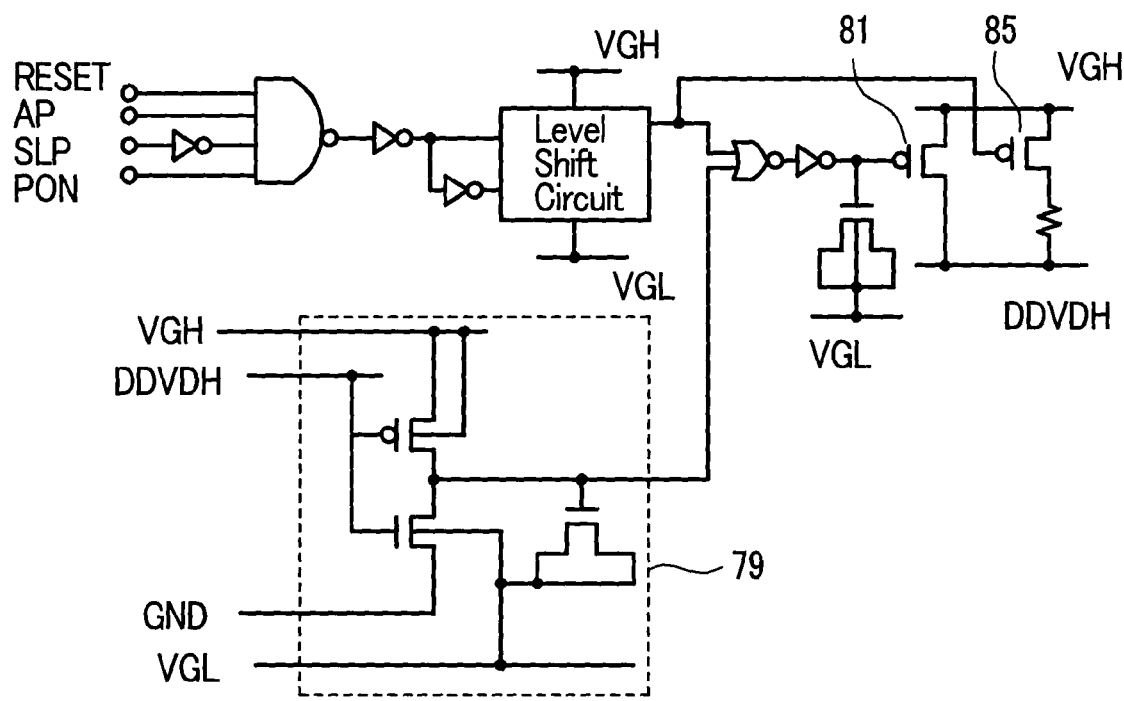
FIG. 29 is a schematic circuit diagram of a level sensing circuit of the drive circuit used in the liquid crystal display device of the present invention.

FIG. 29 shows a circuit which includes the level sensing circuit 79 and which controls ON/OFF operation of the low resistance switch 81 and the high resistance switch 85. Here, the low resistance switch 81 and the high resistance switch 85 are switches which short-circuit the power source voltages DDVDH and VGH shown in FIG. 26 short-circuited. Further, symbol RESET denotes a RESET signal, symbol AP denotes is a signal which indicates that a period is the period A in FIG. 27A, symbol SLP denotes a sleep mode signal which is used for stopping the operation of the power source circuit and converts the display to the non-display, and symbol PON denotes a signal which indicates outputting/stopping of the power sources VGH, VGL and VCL and is a signal which indicates that a period is the period B in FIG. 27A.

The level sensing circuit 79 shown in FIG. 29 outputs the voltage VGH, when the relationship VGH>DDVDH is established, and outputs the voltage VGL, when the relationship VGH<DDVDH is established. As shown in FIG. 27, since the relationship VGH<DDVDH is established during the power source ON state and the relationship VGH>DDVDH is established during the power source OFF state, the low resistance switch 81 assumes the ON state during the power source ON period and the OFF state during the power source OFF period, while the high resistance switch 85 assumes the ON state for the power source OFF period. Here, in the circuit shown in FIG. 29, although the high resistance switch 85 assumes the ON state even during the power source ON period, since the low resistance switch 81 assumes the ON state during the power source ON period, with respect to the resistance between the power source VGH and the power source DDVDH, the low resistance switch 81 is dominant. Accordingly, it is not always necessary for the high resistance switch 85 to assume the OFF state, and, hence, it is possible to use the level sensing circuit 79 shown in FIG. 29.

Figure 30A:
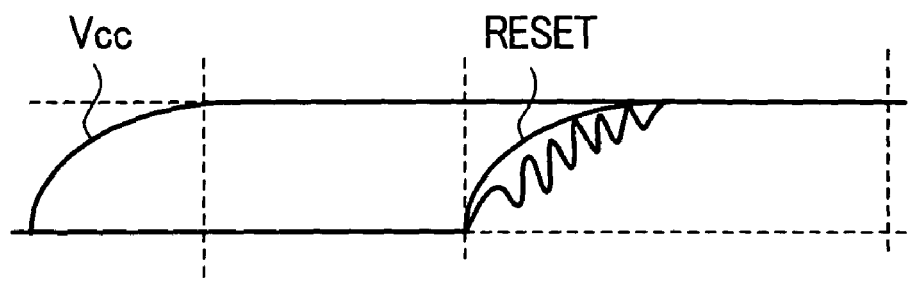
FIG. 30A is an output waveform diagram showing reset signals of the drive circuit used in the liquid crystal display device of the present invention.
Figure 30B:
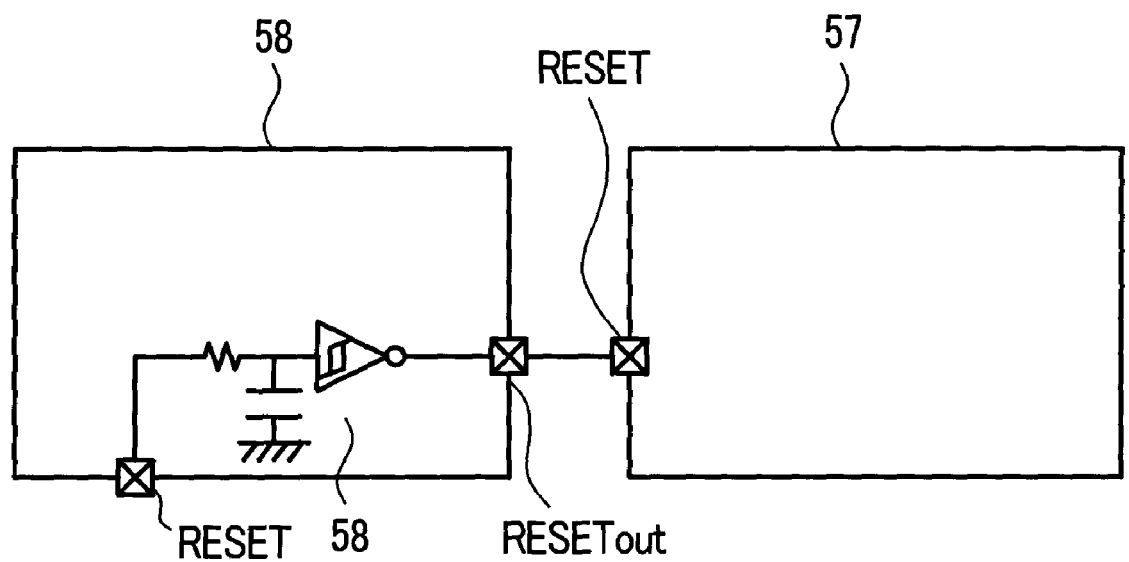
FIG. 30B is a schematic circuit diagram of a low-pass filter.

FIG. 30 shows rising waveforms of the POWER ON RESET signal. When the POWER ON RESET signal rises during the starting period of an oscillator, the waveform becomes unstable, as shown in FIG. 30A. Accordingly, the drive circuit 50 suffers from erroneous operations. Accordingly, to prevent an erroneous operation, a low pass filter is provided inside the driving circuit. As shown in FIG. 30B, the low pass filter is provided inside the drive circuit 50 so as to reduce noises carried by the RESET signal. In FIG. 30, the low pass filter is provided to the scanning signal line drive circuit 58, and the reset signals are transmitted to the video signal line drive circuit 57 through output terminals RESETout.

Figure 31A:
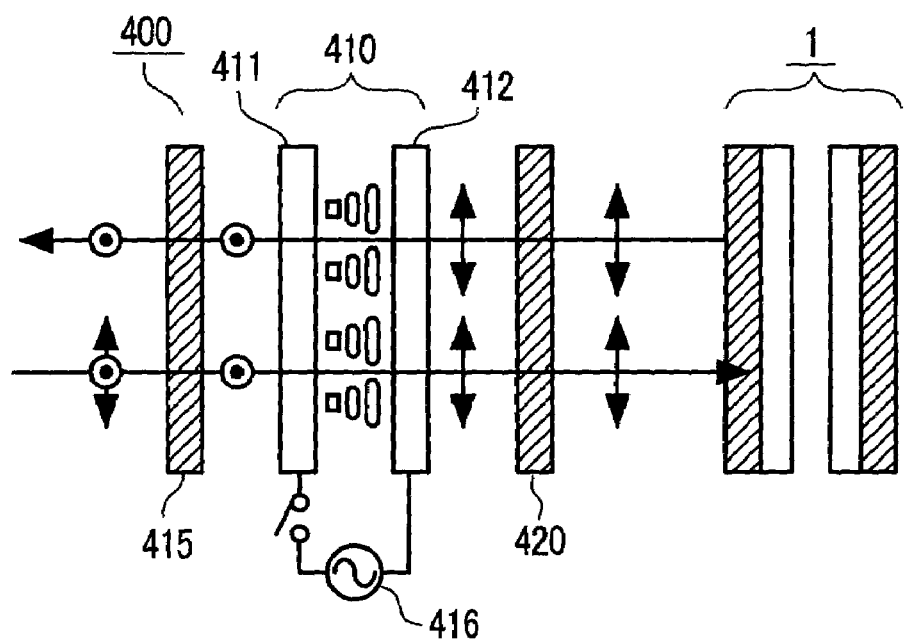

A mirror-type liquid crystal display panel will be explained in conjunction with FIGS. 31A and 31B in which numeral 1 indicates a liquid crystal display panel which operates to produce a display. At the side for observing the liquid crystal display panel 1, a mirror liquid crystal display panel 400 is provided. The mirror liquid crystal display panel 400 includes a transmission polarization axis variable portion 410, a reflection-type polarization portion 420 and an absorption-type polarization portion 415.

The transmission polarization axis variable portion 410 is capable of controlling the polarization axis of light of the incident rectilinear polarization to a state in which the polarization axis is changed and a state in which the polarization axis is not changed when the light passes through the transmission polarization axis variable portion 410. As shown in FIG. 31A, between electrodes formed on a pair of substrates 411 and 412, when the voltage from the power source 416 is not applied, the polarization axis of the light of the incident rectilinear light is changed, and the light passes through the reflection-type polarization portion 420 and reaches the liquid crystal display panel 1. To the contrary, when the light irradiated from the liquid crystal display panel 1 is rectilinear polarized light which passes through the reflection-type polarization portion 420, the light irradiated from the liquid crystal display panel 1 passes through the mirror liquid crystal display panel 400 and reaches an observer.

Figure 31B:
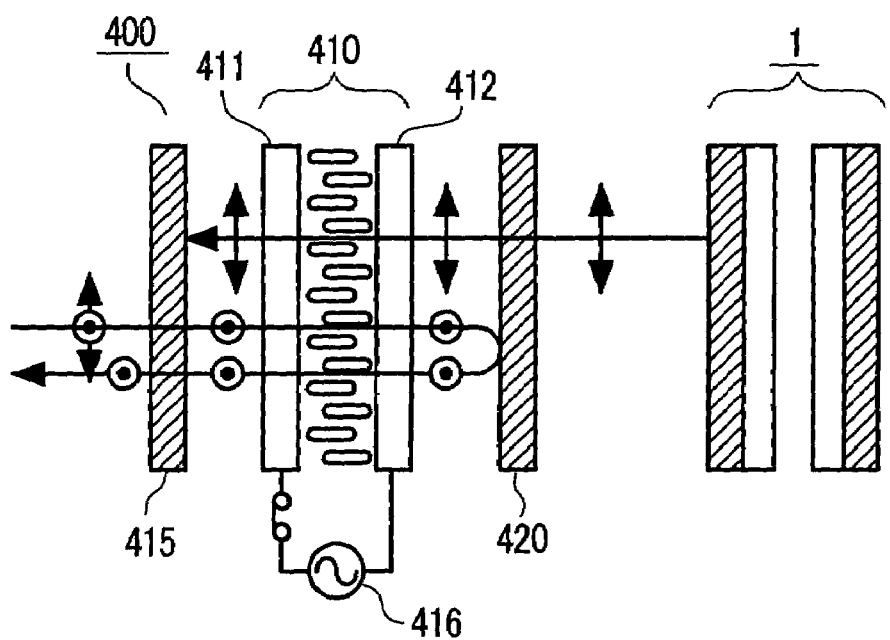

To the contrary, when the voltage is applied between the electrodes formed on the substrate 411 and the substrate 412 shown in FIG. 31B, the polarization axis of the light of rectilinear polarized light incident on the transmission polarization axis variable portion 410 is not changed, and, hence, the light is reflected on the reflection-type polarization portion 420. On the other hand, when the light irradiated from the liquid crystal display panel 1 is rectilinear polarized light which passes through the reflection-type polarization portion 420, the light is absorbed by an absorption-type polarization portion 415 and does not reach the observer.

Figure 32A:
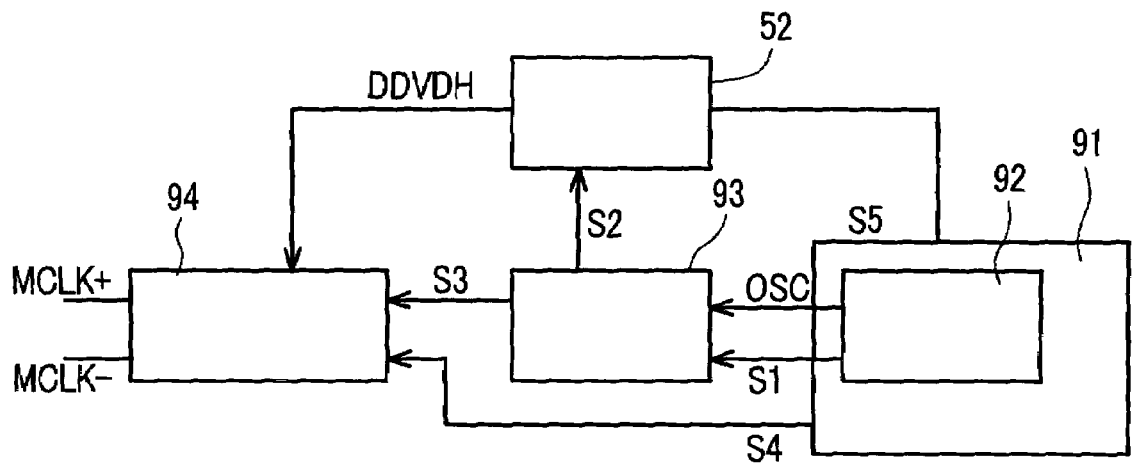
FIG. 32A is a block diagram showing the overall configuration of a mirror type liquid crystal display panel used in the liquid crystal display device of the present invention.

Here, the voltage applied to the mirror liquid crystal display panel 400 is subjected to AC driving in the same manner as the liquid crystal display panel 1. Accordingly, a mirror liquid crystal display panel drive circuit 94 is provided to the drive circuit 50. FIG. 32A shows the overall constitution of the mirror liquid crystal circuit. A mirror liquid crystal display panel driving signal MCLK is outputted from the mirror liquid crystal circuit. It is possible to drive the mirror liquid crystal display panel using a frequency which is sufficiently late to not cause a problem on the liquid crystal, so that the mirror liquid crystal display panel drive circuit 94 is driven with a low frequency for power saving of the mirror liquid crystal display panel drive circuit 94. However, since the signal OSC transmitted from the controller or the like is a high frequency signal, the mirror liquid crystal display panel drive circuit 94 is provided with a frequency dividing circuit 93.

In FIG. 32A, the mirror liquid crystal circuit includes an oscillator 92, the frequency dividing circuit 93 which divides the frequency of the clock, a booster circuit 52 and the mirror liquid crystal display panel drive circuit 94. The frequency dividing circuit 93 produces a clock S2 for operating the booster circuit 52 and a clock S3 for operating the mirror liquid crystal display panel drive circuit 94 in response to a signal S1 from the controller 91. The booster circuit 52 supplies the power source DDVDH to the mirror liquid crystal display drive circuit 94. Further, in response to the signal S4 from the controller, the mirror liquid crystal display panel drive circuit 94 controls outputting of a clock MCLK+ and a clock MCLK− for mirror liquid crystal driving.

Figure 32B:
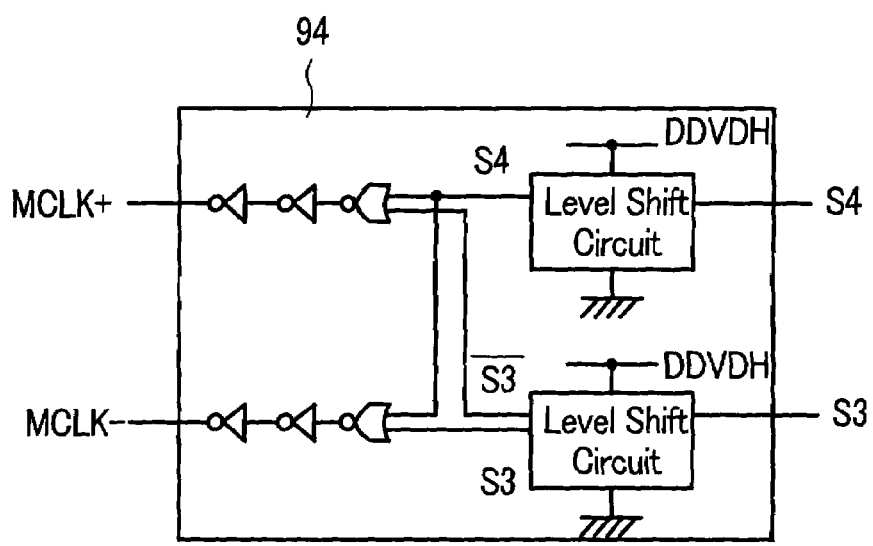
FIG. 32B is a schematic circuit diagram of a mirror type liquid crystal display panel drive circuit.

Next, FIG. 32B shows the mirror liquid crystal display drive circuit 94. The clock MCLK+ and the clock MCLK− are outputted at a cycle of the clock S3 and the clock MCLK− has an output level thereof inverted with respect to the clock MCLK+.

The mirror liquid crystal display panel assumes a state in which the mirror liquid crystal display panel reflects light when a certain voltage is applied between the counter electrodes. The clock MCLK+ is applied to one electrode of the mirror liquid crystal display panel and the clock MCLK− is applied to another electrode of the mirror liquid crystal display panel. A seizure phenomenon occurs in the liquid crystal when a DC voltage is applied thereto, and, hence, AC driving is necessary. An amplitude is set to the power source DDVDH at the High side and GND at the low side. This is because, it has been found as a result of a study that such constitution can minimize the use of the booster circuit, and, hence, the power consumption can be minimized. Here, since the level of the voltage which drives the mirror liquid crystal display panel differs depending on the threshold value of the liquid crystal to be used, to cope with the liquid crystal having the low threshold value, the mirror liquid crystal display panel is configured such that the level (approximately 3V) of the input power source voltage Vin can be also used in addition to the level (5V) of the power source DDVDH as the level of voltage for driving.

Next, the display state of the mirror liquid crystal display and the outputting levels of the clock MCLK+ and the clock MCLK− and the levels of respective power sources will be explained. First of all, when the mirror liquid crystal display panel is not used (when the transmission of light is allowed), both the clock MCLK+ and the clock MCLK− assume the GND level. This control is performed to prevent the application of the DC voltage to the liquid crystal. The control is performed in response to the signal S4 in FIG. 32A, wherein, when the signal S4 is at the High level, outputting of the clock MCLK+ and the clock MCLK− assumes GND. This can be realized by the circuit shown in FIG. 32B. When the mirror liquid crystal display panel is used (when the light is reflected), the clock MCLK+ and the clock MCLK− at the High-side level can output both of the voltage at the DDVDH level and the voltage at the Vin level.

The High-side level is equal to the level of the power source voltage of the circuit shown in FIG. 32B, and, hence, the booster circuit 52 is controlled in response to the signal S5 from the controller 91, so as to control the voltage value of the power source DDVDH inputted to the circuit shown in FIG. 32B. When the voltage value is at the Vin level, the short-circuiting switches 81, 82, 83 and 84 shown in FIG. 26A are short-circuited, and all booster circuits stop the boosting operations. Accordingly, in the circuit shown in FIG. 26A, since the short-circuiting switch 82 is turned on, the voltage of the power source DDVDH of the circuit shown assumes the same voltage value as that of the power source Vin, and the voltage of the power source DDVDH of the circuit shown in FIG. 32 assumes the same voltage value as that of the power source Vin. Eventually, with respect to the power source voltage, only the power source voltage having the Vin level necessary for the mirror liquid crystal driving is present, and, hence, the reduction of power consumption can be achieved, and there is no inversion of the respective levels due to the short-circuiting switches, whereby the stable operation is ensured.

Next, when the voltage value is at the DDVDH level, the short-circuiting switches 81, 83 and 84 shown in FIG. 26A are short-circuited so as to operate the booster circuit 52. Due to this control, the DDVDH level, which is necessary for the mirror liquid crystal driving, is produced and other booster circuits are stopped; and, hence, the reduction of power consumption can be achieved, and there is no inversion of the respective power source levels due to the short-circuiting switches, whereby the stable operation is ensured.

Figures 33, 34:
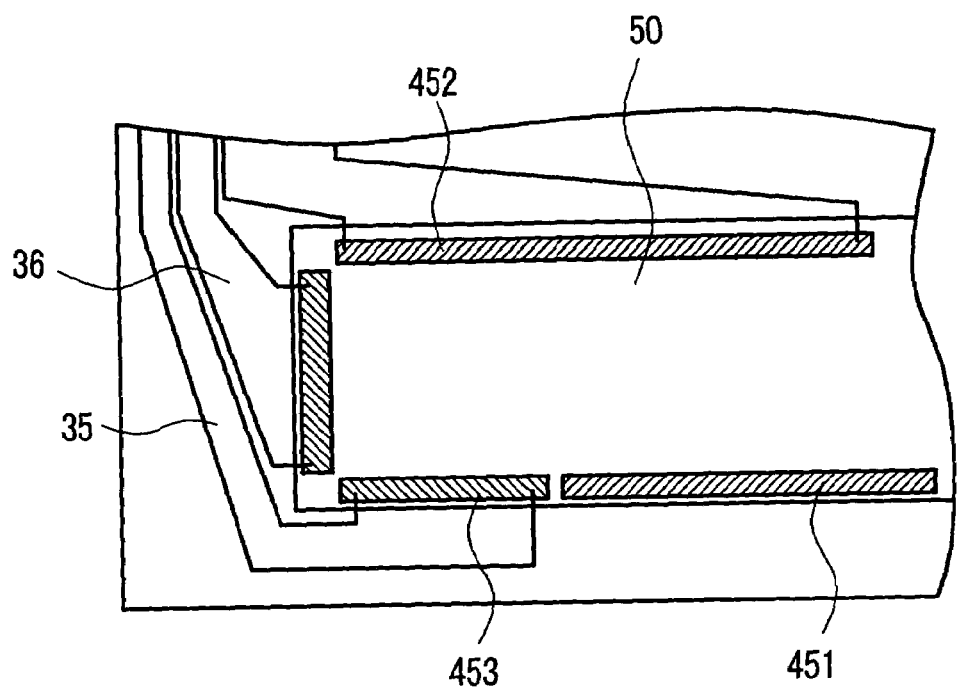
FIG. 33 is a diagram showing the arrangement of terminals of a drive circuit used in the liquid crystal display device of the present invention.
FIG. 34 is a table showing the function of the instruction signals and the arrangement of bits used in the liquid crystal display device of the present invention.

Then, the arrangement of terminals of the drive circuit 50 is shown in FIG. 33. Numeral 451 indicates an input terminal region, numeral 452 indicates a scanning signal line terminal region for the liquid crystal display panel (main panel) 1, and numeral 453 indicates a scanning signal line terminal region for the liquid crystal display panel (sub panel) 200. The scanning signal line terminal regions 452, 453 are formed in a concentrated manner on two sides, where the line 35 for the sub-panel scanning signals and the line 36 for the scanning signal of the drive circuit 50 are formed. On the other hand, the input terminal region 451 is formed in a concentrated manner on the side to which the flexible board 30 is connected. Further, since the externally mounted capacitors are mounted on the flexible substrate 30, terminals which are connected to these externally mounted capacitors are also formed on the same input terminal region 451.

The liquid crystal display device of the present invention uses instruction signals for changing the scanning method or the magnification of booster circuits depending on the arrangement of two liquid crystal display panels. FIG. 34 shows an example of the instruction signals. The instruction signals shown in FIG. 34 represent serial data constituted of 16 bits. Signals of 16 bits arranged in the lateral direction in the drawing are transmitted to the drive circuit 50 from the outside as instruction signals. Although six instruction signals are arranged in parallel in the longitudinal direction in the drawing, with respect to the instruction signals shown in FIG. 34, 3 bits ranging from D15 to D13 form index codes and discriminate the contents of the instruction signals.

With respect to the instruction signals in the index code (000), D0 constitutes a SLP bit for setting a sleep mode, and D11 constitutes a GON bit for setting display ON/OFF states. In a range from D1 to D3, a fixed current quantity of fixed current sources in a built-in operational amplifier is adjusted with the AP bits. When all of AP0 to AP2 are 0, the period A shown in FIG. 27A is set. During this period A, the booster circuit output DDVDH is operated in a state that the operation of the operational amplifier is stopped. In a range from D4 to D6, the boosting cycle of the booster circuit is set with the DC bits. Although the driving ability of the booster circuit is enhanced by accelerating the boosting cycle, the consumption of current is increased. In a range from D7 to D9, the boosting magnification of the booster circuit 53 with respect to the power source circuit 4 shown in FIG. 23 can be changed in response to the BT bit.

With respect to the instruction signals of the index code (001), D11 constitutes the function allocation bits and functions of respective bits differ depending on whether D11 is 1 and 0. First of all, a case in which D11 is 0 will be explained. D7 assumes the PON bit, and the operation and the stopping of the power sources VGH, VGL and VCL are set. When PON bit=1, the operation of the power sources VGH, VGL and VCL is started to set the operation during the period B shown in FIG. 27A. D9 and D10 set the outputting and the stopping of the common voltage VCOM1 for the main liquid crystal display panel and the common voltage VCOM2 for the sub-liquid crystal display panel. When the D11 bit is 1, D3 and D4 assume the M1 bits and set the outputting and the stopping of the clock MCLK+ and the clock MCLK− for mirror liquid crystal driving. D1 to D3 assume the MFL bits, wherein the frequency of the input clock is divided so as to adjust the alternating cycle of the clock MCLK+ and the clock MCLK− for mirror liquid crystal driving.

With the instruction signal having the index code (010), D0 to D4 assume the VCM bit and set the common voltage VCOM2 for the sub-liquid crystal display panel. Here, when (11111) is set to D0 to D4, the adjustment based on a built-in volume is stopped so as to enable the adjustment using the externally mounted resistances. D5 to D9 constitute VDV bits and set AC amplitudes of the common voltage VCOM1 for the main liquid crystal display panel and the common voltage VCOM2 for the sub-liquid crystal display panel.

With the instruction signal having the index code (110), 5 bits from D0 to D4 constitute SC0 to SC4 bits for setting the output start position of the scanning signal lines, while 5 bits from D5 to D9 constitute the NL0 bit to NL4 bit for setting the effective number of lines of the scanning signal lines. D10 constitutes the GS bit, which sets whether the outputting direction is the normal direction or the reverse direction.

With the instruction signals of the index code (111), 2 bits consisting of D0 and D1 constitute FL bits, which set the field number of the interlace mode.

Here, with respect to the output start position and the effective line number designated by the instruction signals, it is possible to designate the number of scanning signal lines or designate the output line numbers in response to a mode such as the 110 line outputting mode, the 100 line outputting mode or the like.

To briefly recapitulate the advantageous effects obtained by typical aspects of the invention disclosed in the present application, such effects are set forth as follows.

(1) According to the liquid crystal display device of the present invention, in the portable equipment on which the main panel and the sub-panel are mounted, it is possible to reduce the mounting area of the drive circuits, and, hence, it is possible to freely choose the arrangements of the drive circuits.

(2) According to the liquid crystal display device of the present invention, the number of externally mounted parts can be reduced, and, hence, it is possible to realize a liquid crystal display device, driven by a battery, which can be conveniently carried.

The invention claimed is:

1. A display device comprising:
    a first display panel;
    a second display panel;
    wiring which connects between the first display panel and the second display panel;
    drive circuit which is connected to the first display panel;
    output terminals which are mounted on the first display panel and to which signals are supplied from the drive circuit; and
    signal wiring which is outputted from the drive circuit, the signal wiring being electrically connected to pixels mounted on the first display panel and being connected to output terminals; wherein
    the drive circuit includes a booster circuit,
    the booster circuit outputs a first common voltage for the first display panel and a second common voltage for the second display panel, and
    the booster circuit is capable of changing magnification for boosting in response to an external signal.

2. A display device according to claim 1, wherein the drive circuit is mounted on an insulating substrate which constitutes the first display panel.

3. A display device according to claim 1, wherein the signal wiring includes first signal wiring which has one end thereof connected to the drive circuit and another end connected to an output wiring and second signal wiring which has one end thereof connected to the drive circuit and another end connected to a wiring capacitance adjusting element.

* * * * *